(12) United States Patent
Krstovic

(10) Patent No.: US 7,134,679 B2
(45) Date of Patent: Nov. 14, 2006

(54) TOWING DEVICE USED TO FACILITATE CONNECTION OF A TOWING VEHICLE TO A TOWED VEHICLE

(76) Inventor: Alexander Peter Krstovic, 104 Cindy La., Easley, SC (US) 29642

( * ) Notice: Subject to any disclaimer, the term of this patent is extended or adjusted under 35 U.S.C. 154(b) by 0 days.

(21) Appl. No.: 11/043,023

(22) Filed: Jan. 25, 2005

(65) Prior Publication Data

US 2006/0163841 A1    Jul. 27, 2006

(51) Int. Cl.
    B60D 1/40    (2006.01)
(52) U.S. Cl. .................. 280/479.1; 280/479.2
(58) Field of Classification Search ............ 280/478.1, 280/479.1, 479.2, 479.3
    See application file for complete search history.

(56) References Cited

U.S. PATENT DOCUMENTS

| | | | |
|---|---|---|---|
| 2,745,680 A | 5/1956 | Achenbach et al. | |
| 3,126,210 A | 3/1964 | Hill | |
| 3,140,881 A * | 7/1964 | Antici | 280/479.2 |
| 4,159,833 A * | 7/1979 | Meiners | 280/478.1 |
| 4,269,428 A * | 5/1981 | Rexine | 280/491.1 |
| 4,744,583 A | 5/1988 | Blackwood | |
| 4,773,667 A * | 9/1988 | Elkins | 280/479.3 |
| 4,944,525 A | 7/1990 | Landry | |
| 4,951,957 A * | 8/1990 | Gullickson | 280/479.2 |
| 5,322,315 A * | 6/1994 | Carsten | 280/479.2 |
| 5,547,210 A * | 8/1996 | Dugger | 280/477 |
| 5,580,088 A | 12/1996 | Griffith | |
| 5,630,606 A * | 5/1997 | Ryan | 280/479.3 |
| 5,725,231 A * | 3/1998 | Buie | 280/455.1 |
| 5,727,805 A * | 3/1998 | La Roque | 280/478.1 |
| 6,364,337 B1 | 4/2002 | Rowland et al. | |
| 6,494,477 B1 | 12/2002 | Parker | |
| 6,871,868 B1 * | 3/2005 | Pogue | 280/479.1 |

OTHER PUBLICATIONS

Cabela's Adjustable Tri-Ball Hitch http:www.cabelas.com/cabelas/en/templates/product/standard-item.jhtml?id=0017686521116a& . . . .

Cabela's SpeedHitch http:www.cabelas.com/cabelas/en/templates/product/standard-item.jhtml?id=0013481512385a& . . . .

Putnam Custom-Fit Bolt Receivers http:www.cabelas.com/cabelas/en/templates/pod/standard-pod-wrapped.jhtml?id=0006627&nav . . . .

* cited by examiner

*Primary Examiner*—Kevin Hurley
(74) *Attorney, Agent, or Firm*—Dority & Manning. P.A

(57) ABSTRACT

A towing device is provided for use on a vehicle to facilitate the connection of a trailer hitch to a coupler. The towing device has a frame configured to be securely attachable to an undercarriage of the vehicle. An extension bar movably engages the frame. The movable engagement between the frame and the extension bar permits the extension bar to be extendable from the frame and retractable to a towing position with the frame facilitating the extension bar to be rotatable as the extension bar is extended. The extension bar may carry either a trailer hitch or a coupler.

34 Claims, 17 Drawing Sheets

TOWING DEVICE USED TO FACILITATE CONNECTION OF A TOWING VEHICLE TO A TOWED VEHICLE

CROSS REFERENCES TO RELATED APPLICATIONS

N/A

STATEMENT OF FEDERALLY SPONSORED RESEARCH OR DEVELOPMENT

N/A

FIELD OF THE INVENTION

The subject matter of the present invention relates to a towing device having an extendable and rotatable portion which facilitates the connection of a towed vehicle to a towing vehicle.

BACKGROUND OF THE INVENTION

Cars, trucks and SUV's are frequently used for service whereby these towing vehicles are operably connected to a trailer or other towed vehicle. For example, trailers having a tongue with a coupler attached thereto are often connected to trailer hitches of towing vehicles to allow for hauling of a wide variety of objects or goods such as boats, ATV's, furniture and the like. Such trailers add much hauling capacity even to heavy duty flat bed trucks thereby increasing the hauling capacity of a vehicle and in some cases providing mobility for use of some goods, such as with boats, which previously was not possible.

While many benefits are gained through the use of such trailers or the possibly of towing other vehicles, a time consuming task occurs during the actual alignment of the hitch on the towing vehicle with the coupler of the towed vehicle to permit a secure connection between both the coupler and the hitch. Often times the towed vehicle must be driven into an exact position so that proper alignment of the hitch of the towing vehicle and the coupler from the towed vehicles will be properly aligned. This is especially the case when the towed vehicle or trailer cannot be physically moved to align the coupler with the trailer hitch. Obtaining this exact alignment of the trailer hitch and the coupler in such cases is extremely time consuming and usually requires at least two individuals to ensure the alignment. Usually one person will have to drive, while another relays how and where to maneuver the towing vehicle to obtain the proper alignment of the trailer hitch and the coupler. This process often requires a series of maneuvers of driving forward and in reverse with slight adjustments by the driver of the towing vehicle to obtain such an alignment.

The coupling of a trailer hitch to a coupler of a lighter weight trailer can be less time consuming but also more hazardous. In similar situations as described above, two individuals are usually required for obtaining such a connection between the towed vehicle and the towing vehicle. Again, one individual will drive the towing vehicle while the second directs the maneuvering of the towing vehicle to get the trailer hitch in very close proximity to the coupler of the towed vehicle. Once the trailer hitch of the towing vehicle is in very close proximity of the coupler of the towed vehicle, one or both of the individuals will move the portion of the towed vehicle having the coupler towards the trailer hitch so that the coupler aligns with the trailer hitch. This is often done by either lifting the tongue of a trailer or other towed vehicle and rotating it toward alignment with the trailer hitch. Injury due to the strain created by lifting the portion of the trailer can occur. Also, such movement of the trailer may shift the weight of the trailer or move a stopper which holds the trailer in its current position so that it may freely roll thereby increasing a risk of injury not only to the individuals trying to align the coupler and the trailer hitch but quite possibly to other individuals or property in proximity to the trailer, or other towed vehicle.

SUMMARY OF THE INVENTION

According to the certain aspects of the invention, a towing device is provided for use on a vehicle to facilitate the connection of a trailer hitch to a coupler. The towing device includes a frame configured to be securely attached to an undercarriage of a vehicle. An extension bar movably engages the frame, thereby permitting the extension bar to be extendable from the frame and retractable to a towing position. The frame facilitates rotatablility of the extension bar as the extension bar is extended. The towing device may be attachable to either a towing vehicle or a towed vehicle. Depending on which type of vehicle to which the towing device is attached, the extension bar may carry either a hitch or a coupler. Further, a drive unit may be in communication with the extension bar for moving the extension bar from an extended position to the towing position. The drive unit may also actuate the extension rotation, and retraction of the extension bar.

According to certain other aspects of the invention, the towing device may include a frame configured to be securely attachable to undercarriage of a vehicle. At least one rail support having a first end and a second end may be provided. The at least one rail support is configured to movably engage the frame on the first end, while the at least one rail support may be configured to be rotatably securable to either the frame or the undercarriage of the vehicle on the second end so that the at least one rail is rotatable about the second end. An extension bar may be provided which has a movable engagement with the at least one rail support. The movable engagement between the at least one rail support and the extension bar permits the extension bar to be extendable from the frame and retractable to a towing position with the at least one rail support facilitating the rotatibility of the extension bar as the extension bar is extended.

The frame may include a support bar with the support bar being movably engaged by the first end of the at least one rail support. Further, the extension bar may include an engagement device which engages the at least one rail support to create the movable engagement. To facilitate this engagement, the rail support may define a slot that is engaged by the engaging device.

According to further certain aspects of the invention, a towing device is used to help facilitate the connection between a towing vehicle and a towed vehicle includes a frame having a support bar with the frame configured to be securely attachable to an undercarriage of a vehicle. Two rail supports operably engage the support bar. Each of the rail supports have a first end and a second end, with the first end of each rail support being configured to movably engage the support bar. The second end of each of the rail supports are rotatably securable at pivot points to either the frame or the undercarriage of the vehicle allowing each of the rail supports to be movable along the support bar while also being rotatable about its respective pivot point. An extension bar is also provided which is configured to movably engage each of the rail supports. The rail supports permit the extension bar to be extendable from the frame and retractable to a towing position within the frame while facilitating the rotatability of the extension bar.

As with the other exemplary embodiments, the extension bar may carry either a hitch or a coupler depending on whether the towing device is attached to a towing vehicle or a towed vehicle.

Also, a drive unit may be in communication with an extension bar for moving the extension bar from an extended position into a towing position. Such a drive unit may comprise a winch and a pulley system.

The extension bar for such an embodiment may take on different configurations. For example, an extension bar may comprise a T-shape extension bar with a first parallel end, a second parallel end and a perpendicular end. The first parallel end and the second parallel end may engage the two rail supports respectively, while the perpendicular end may carry at least one of a hitch or a coupler depending on the type of vehicle to which the towing device is attached. Further, the extension bar may comprise a horseshoe shaped extension bar having a first arms and a second arm with each of the arms engaging one of the two rail supports. The horseshoe shaped extension bar may define a crown that is extendable from and retractable to the frame. The crown of the horseshoe shaped extension bar may have a tongue that extends therefrom. The tongue may carry at least one of a hitch or a coupler depending on the type of vehicle to which the towing device is attached.

All the features of the subject matter will be described in greater detail through the use of the appended figures.

BRIEF DESCRIPTION OF THE DRAWINGS

A full and enabling disclosure of the present invention including the best mode thereof to one of ordinary skill in the art is set forth more particularly in the remainder of the specification, including references to the accompanying figures in which.

DETAILED DESCRIPTION

Reference will now be made in detail to the presently preferred embodiments of the invention, one or more examples of which are shown in the figures. Each example is provided to explain the invention, and not as limitation of the invention. In fact features illustrated or described as part of one embodiment can be used with another embodiment to yield still a further embodiment. It is intended that the present invention cover such modifications and variations.

The present invention is generally directed to a towing device that may be attached underneath a towing vehicle or a vehicle that is being towed which allows for easy attachment of the towing vehicle to the towed vehicle. The towing device consists of a frame that has an extendable and rotatable extension bar which has either a trailer hitch or a coupler attached thereon depending on whether the towing device is attached to a towing vehicle or towed vehicle. With such a towing device, the alignment of the trailer hitch and ball attached thereto with the coupler of a towed vehicle does not have to be in exact alignment. For example, if the towing device has a trailer hitch attached thereto and is attached to a towing vehicle, the towing vehicle only has to get the trailer hitch close to the coupler which is attached to the towed vehicle. Once the trailer hitch is close, the extension bar may be extended and rotated until the trailer hitch on the extension bar is in alignment with the coupler so that the trailer hitch may be coupled with the coupler. In this manner, time is not wasted in getting the exact alignment of the trailer hitch and the coupler. Further, due to the configuration of the extension bar with the trailer hitch thereon being extendable and rotatable from the frame, the perimeter of proximity in which the towing device of the towing vehicle needs to be in order to facilitate alignment of the trailer hitch and the coupler is greatly increased.

Figure 1:
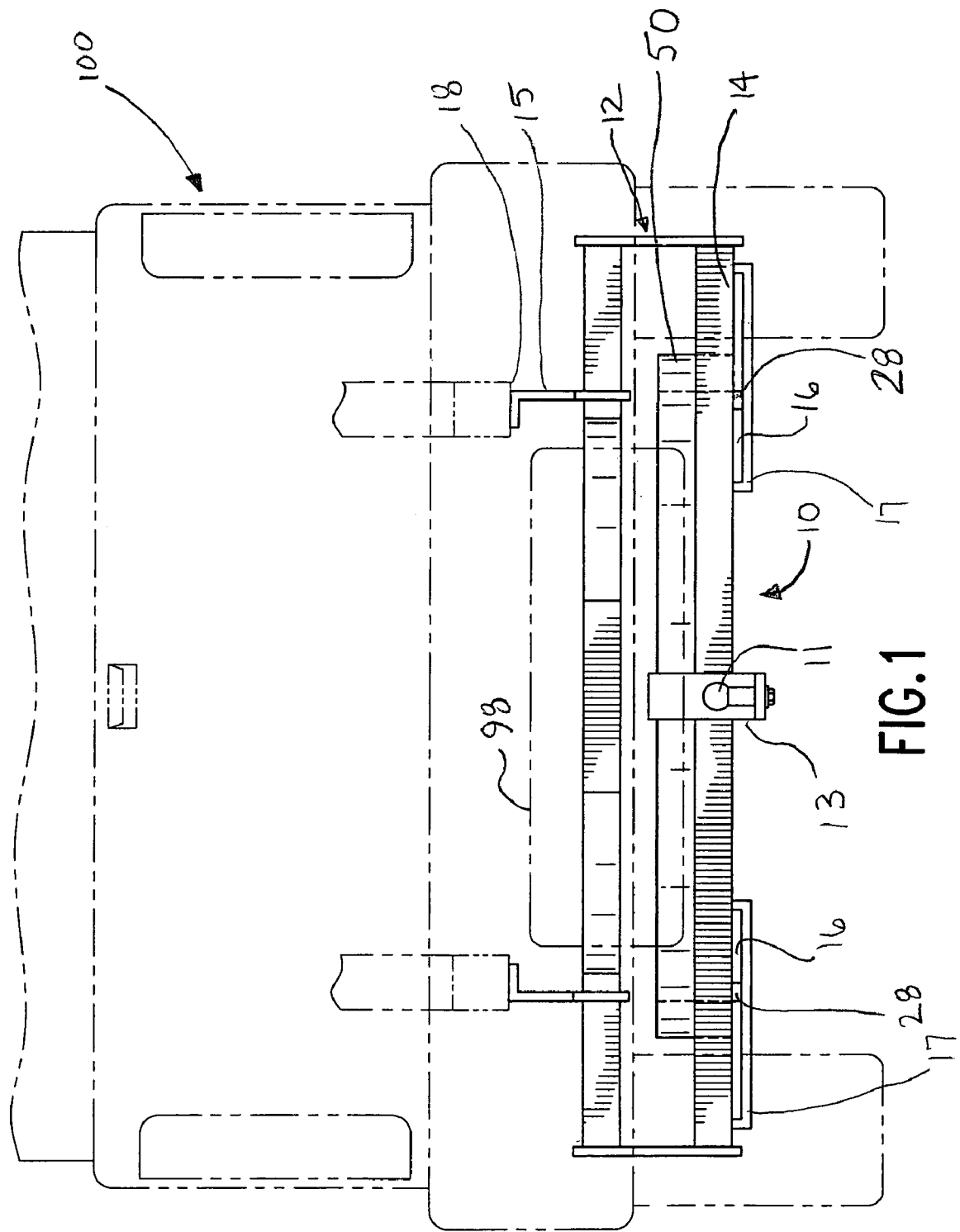
FIG. 1 shows a rear view of a towing vehicle on which an embodiment of a towing device of the present subject matter is attached.

FIGS. 1–8 show an exemplary embodiment of a towing device, generally 10. The towing device 10 includes a frame 12 having an extension bar 50, which, in the shown embodiment, is a horseshoe shaped extension bar 50. As shown in FIG. 1, the frame 12 of the towing device 10 may be securably attached to an under carriage 18 of a vehicle 100 which is shown in phantom. The horseshoe shaped extension bar 50 has a trailer hitch 13 extending therefrom. The trailer hitch 13 includes a hitch ball 11 on which a coupler from a towed vehicle, such as a trailer, may be attached.

In general, the frame and extension bar are subject to different variations. In this exemplary embodiment, the horseshoe shaped extension bar 50 rests within the frame 12.

Figure 5:
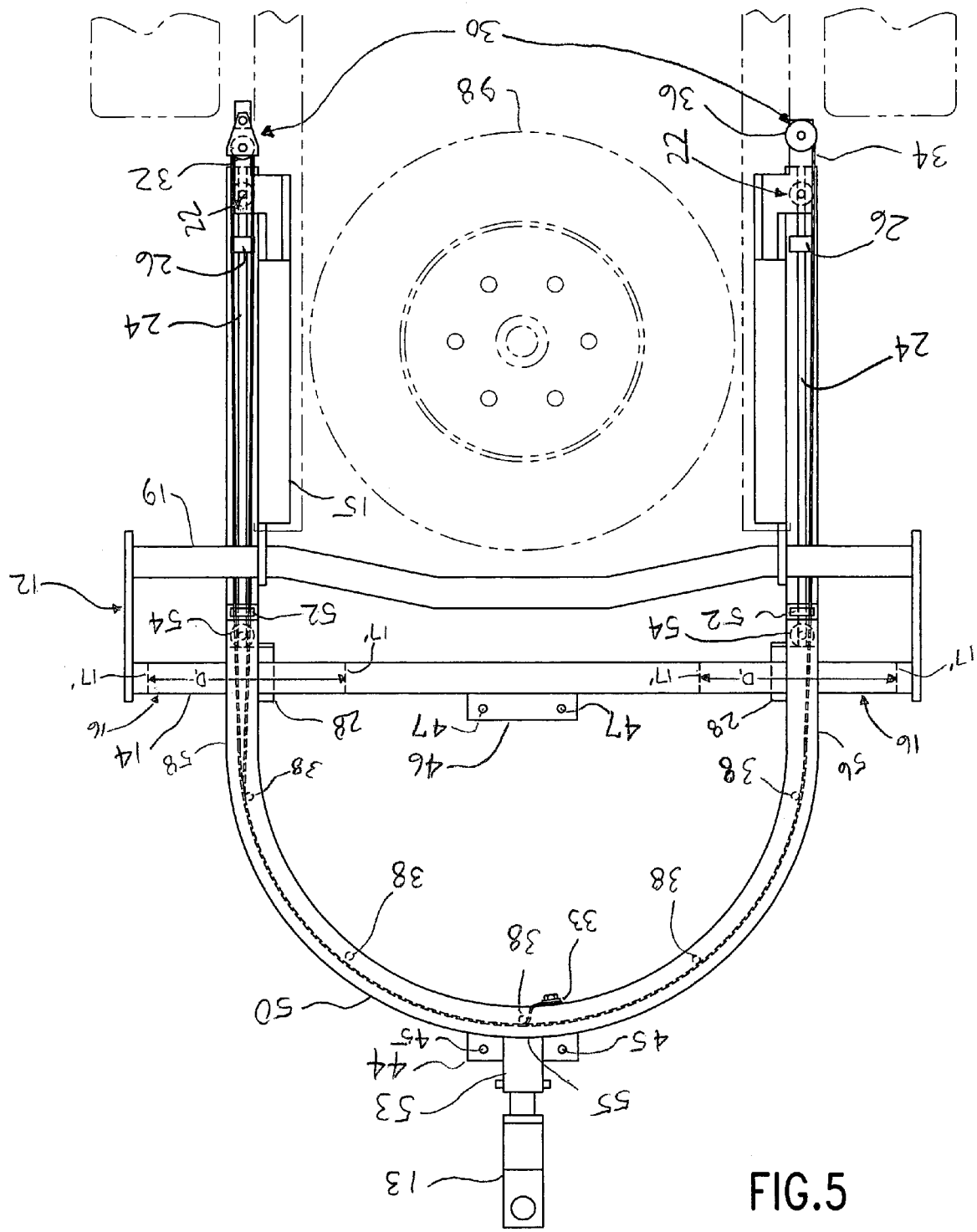
FIG. 5 shows a top view of the towing device shown in FIG. 1 with the extension bar in an extended position.
Figure 6:
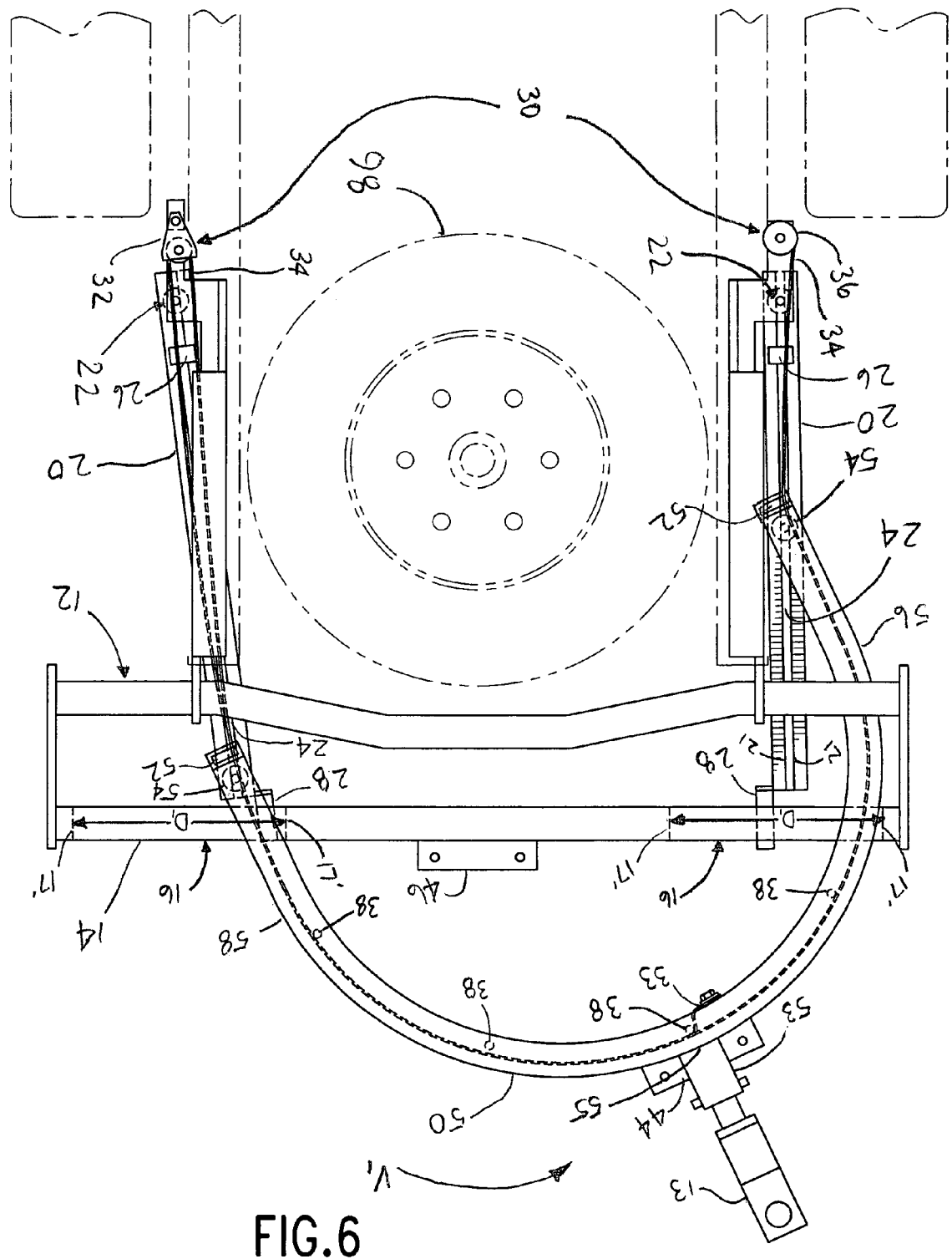
FIG. 6 shows a top view of the towing device shown in FIG. 1 with the extension bar extended and rotated to a first side.
Figure 7:
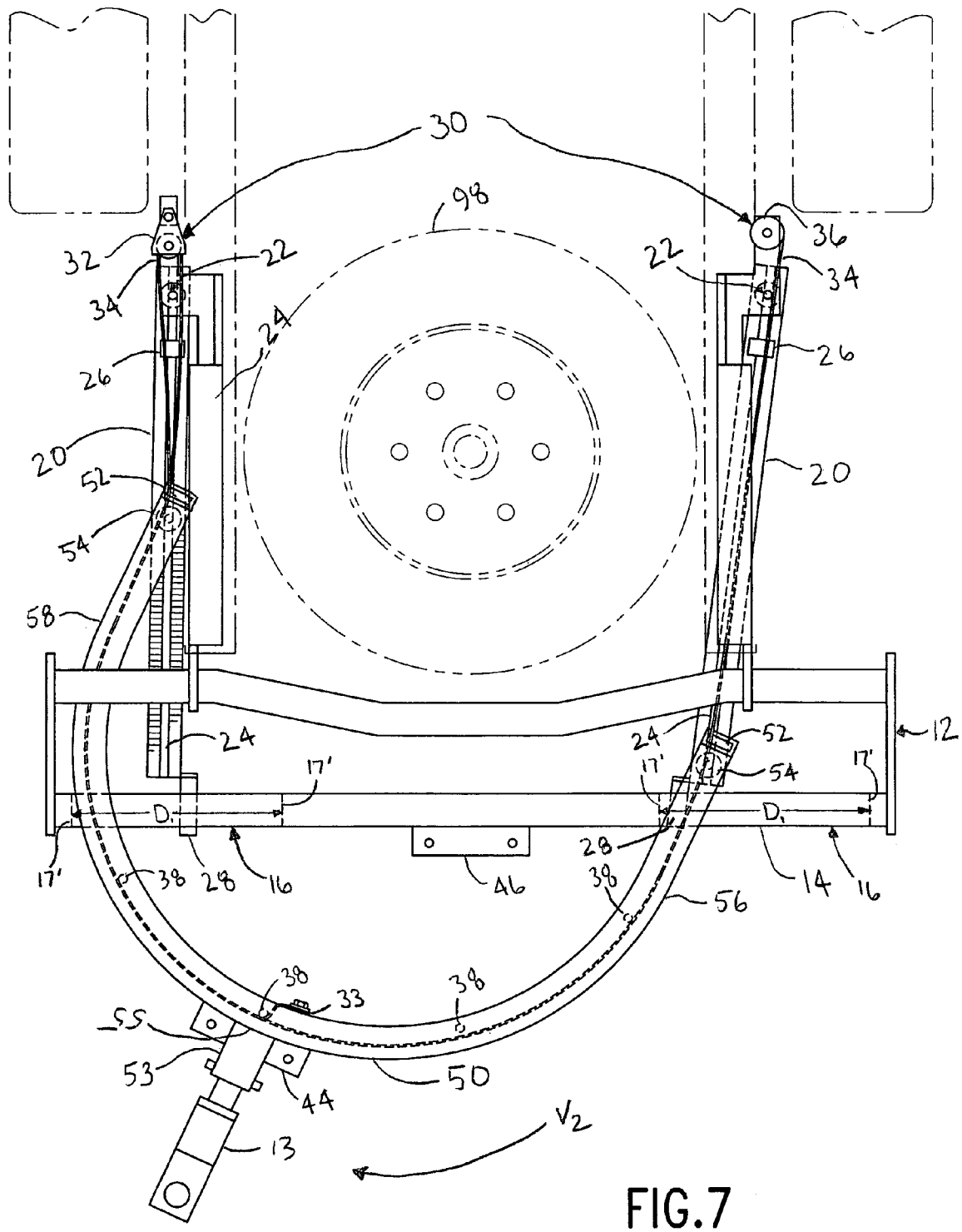
FIG. 7 shows a top view of the towing device shown in FIG. 1 with the extension bar extended and rotated to a second side.

The frame 12 has a support bar 14 which extends beneath the horseshoe shaped extension bar 50. The support bar 14 helps support the extension bar 50 both when the extension bar 50 is in its towing position as shown in FIGS. 1, 2, 3 and 4 or when the extension bar is extended as shown in FIGS. 5–7. Frame 12 also includes connection members 15 which are securable to the undercarriage 18 of the vehicle 100. The connection between the towing device 10 and the vehicle 100 should be secure enough for towing any trailer, camper or other towed vehicle which the towing vehicle 100 is rated to tow.

Figure 2:
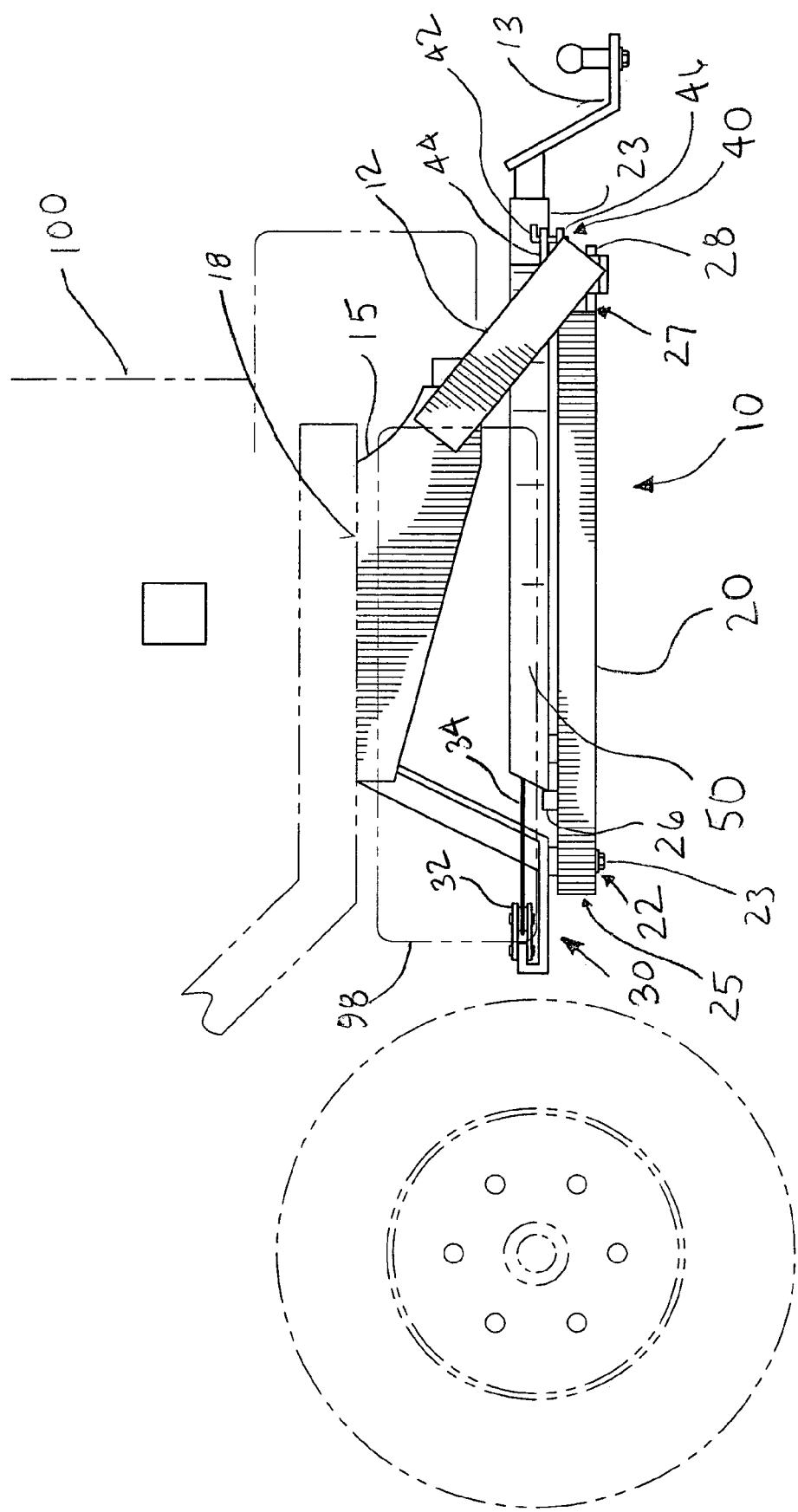
FIG. 2 shows a side view of the towing device shown in FIG. 1.
Figure 4:
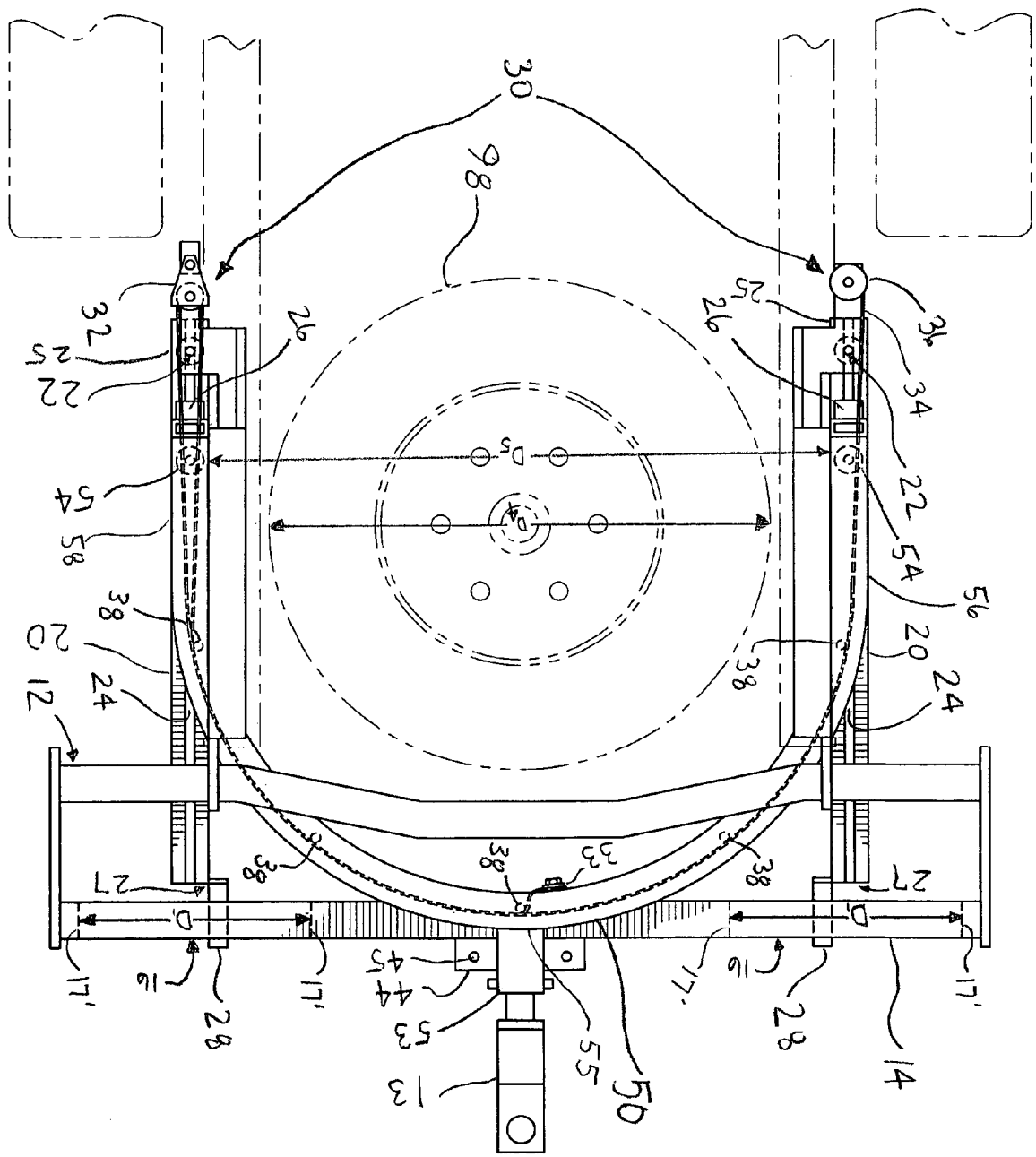
FIG. 4 shows a top view of the towing device shown in FIG. 1 with an extension bar in a towing position.

As can be seen in FIGS. 1, 2 and 4, the towing device which employs the horseshoe shaped extension bar 50, can be advantageously used on vehicles which have their spare tire placed on the underside of the vehicle, although it may be used on other vehicles as well. The vehicle 100 has a spare tire 98 also shown in phantom to the undercarriage 18 of the vehicle 100. The horseshoe shaped extension bar 50 has two arms 58, 56 connected by a curved portion having a crown 55 as shown in FIG. 4. The first arm 56 and the second arm 58 may extend about parallel to one another at a distance $D_5$. In such an embodiment, the distance $D_5$ between the first arm 56 and the second arm 58 is great enough so that the spare tire 98 having a diameter $D_4$ does not interfere with the extension and rotatability of the horseshaped extension bar 50.

To further support the extension bar 50 and to facilitate the extendibility and rotatability of the extension bar 50, two support rails 20 are provided which movably engage the support bar 14 and are rotatably securable to the undercarriage 18 of the vehicle 100. Each of the rail supports 20 possesses a first end 27 and a second end 25. The first ends 27 of the rail supports 20 movably engages the frame 12 of the towing device. In particular, ends 27 have projections 28 which extend into slits 16 of the support bar 14 of the frame 12. As shown in FIG. 1, the support bar may include slit guides 17 which may be integrally attached to the support bar 14 or may be formed in the support bar 14. Alternatively, the slits, or apertures, 16 may be formed in the support bar 14 itself or may have some other configuration which creates a movable engagement between the frame 12 and the rail supports 20.

The second ends 25 of the rail supports 20 may be rotatably secured to the undercarriage 18 of the vehicle 100 creating pivot points 22. The pivot points 22 may be formed by a connection device 23 engaging each of the second ends 25. The connection devices 23 maybe any type of device that allows the second end 25 of a rail support 20 to be secured to the undercarriage 18, while still allowing the rail support 20 to rotate around the second end 25. Such connection devices includes bolts, pins, rods, etc.

By having the second ends 25 of each rail support 20 rotatably securable to the undercarriage 18 of the vehicle 100, the first ends 27 of the rail supports 20 may rotate about the second ends 25 by having the projections 28 at the first ends 27 of the rail supports 20 inserted into the slits 16 of the support bar 14. The rail supports 20 are thus supported by the support bar 14. In this manner, the rail supports 20 along with the support bar 14 of the frame 12 support the horseshoe shaped extension bar 50.

A portion of each rail support 20 defines a slot 24, which at least partially runs laterally between the first end 27 and the second end 25 of the corresponding rail support 20. The extension bar 50 has engagement devices 54 attached thereto that interact with the rail supports 20 by engaging the slots 24. Engagement devices 54 may slide along their respective slots 24 of the corresponding rail supports 20. To facilitate the movement of the extension bar 50, lubrication may be used to lubricate the rail supports 20 and the engagement device 54. In this manner, the extension bar 50 may be extended out from its towing position shown in FIGS. 1–4 to an extended position shown in FIG. 5 by sliding along the top of the rail supports 20 as the engagement device 54 slide within the slots 24. To get the trailer hitch 13 close enough to the coupler of the trailer, or other towed vehicle, that the vehicle 100 will be towing, the slots 24 of the rail supports 20 permit the extension bar 50 to be extendable so that the trailer hitch 13 can engage the coupler of the trailer, or other towed vehicle.

Figure 3:
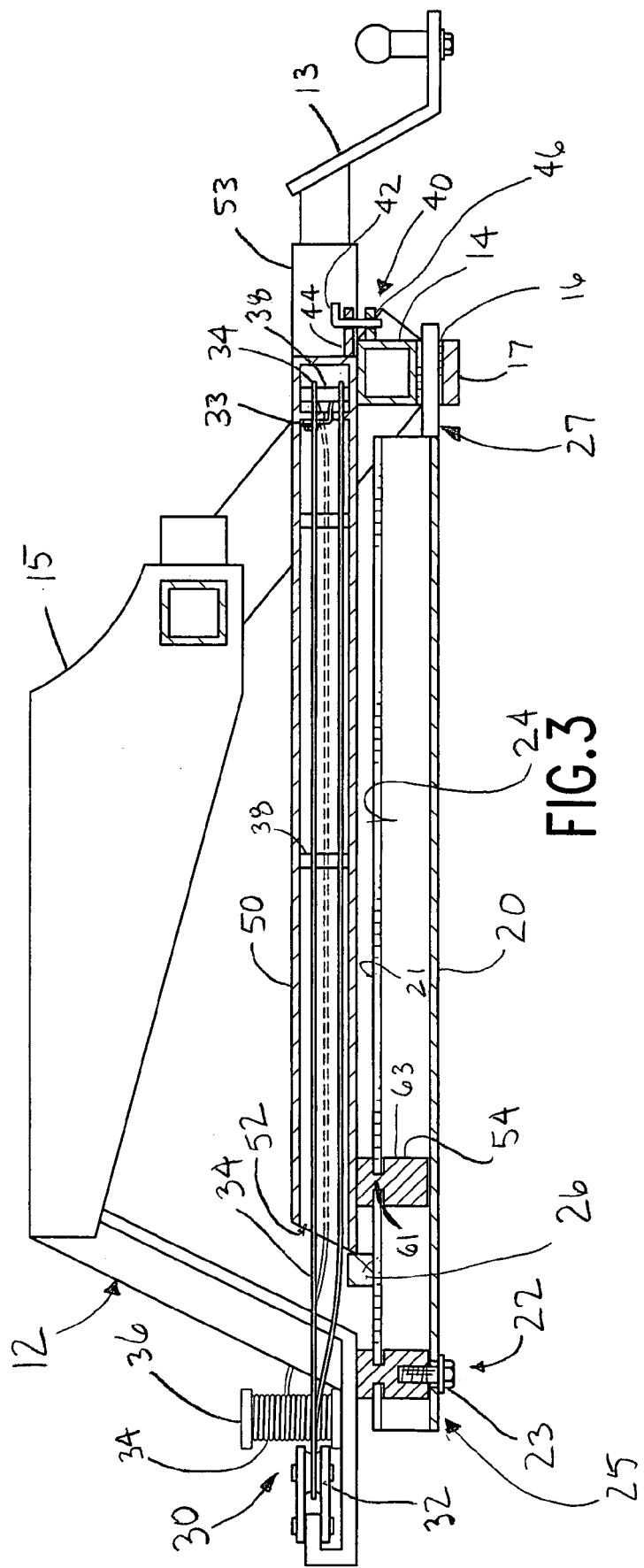
FIG. 3 shows a partial cross-sectional view of the towing device shown in FIG. 1.

In the exemplary embodiment shown, the engagement device 54, which may be a roller, knuckle, or the like, may have a wider bottom portion 63 as shown in FIG. 3 that fits into a hollow portion of the rail support 20, while a neck portion 61 rides along the slots 24 in the rail support 20. The slot 24 of each rail supports 20 forms lips 21 on either side which holds the neck 61 of the engagement device 54 snuggly within the slot 24. In this manner, the cantilever effect generated by the weight of the portion of the extension bar 50 that extends past the support bar 14 will not pull the extension bar 50 out of the slot 24 once the extension bar 50 has been extended. However, in other embodiments, other conventional methods may be used to keep the extension bar engaged with the rail supports. For example, a sleeve or collar engagement device may be used that at least partially surrounds and is capable of sliding along the rails supports.

After extending the extension bar 50, if the trailer hitch is still not aligned with the coupler of the trailer, or other towed vehicle, the extension bar may be rotated in a direction $V_1$ or direction $V_2$ as shown in FIGS. 6 and 7, respectively. By simply manually turning the extension bar 50 to one side or the other, the alignment of the coupler and the trailer hitch may be made. The rotation of the extension bar 50 is facilitated by the independent movable engagement of each rail support 20 with the support bar 14. The rotation of the extension bar 50 may be done as the extension bar 50 is being pulled outward from the frame 12. As stated above, a projection 28 at each first end 27 of each rail support 20 engages the slit 16 of the support bar 14. Through the use of this engagement of the projections 28 with the slits 16, each rail support 20 can move separately from the other rail support 20 depending on the movement of the extension bar 50.

As shown in FIG. 6, if the extension bar 50 is rotated in a direction $V_1$ so that the tow hitch 13 is moved toward a first side, the rail support 20 that engages the second arm 58 of the extension bar 50 is forced toward the inside of the frame 12 as that rail support 20 is rotated around its pivot point 22. As the engagement device 54 on the second arm 58 of the horseshoe shaped extension bar 50 approaches the portion of its corresponding slot 24 closest to the frame 12, the engagement device 54 on the first arm 56 slides down its corresponding slot 24 of its corresponding rail support 20 away from the frame 12. Such motion forces the projection 28 of the rail support 20 supporting the second arm 58 toward a sidewall 17' in the middle of the frame 12, while the rail support 20 supporting the first arm 56 is moved relatively little.

Conversely, as shown in FIG. 7, when the extension bar 50 is turned in a direction $V_2$ so that the trailer hitch 13 is moved toward a second side, the engagement device 54 attached to the first arm 56 rides up the corresponding slot 24 towards the frame 12 forcing the corresponding rail support 20 to rotate around its pivot point 22. At the same time, the engagement device 54 attached to the second arm 58 slides down its corresponding slot 24 away from the frame 12. The projection 28 on the first end 27 of the rail support 20 that supports the first arm 56 of the extension bar 50 is slid along its slit 16 toward a side wall 17' of that slit 16, while the projection 28 of the rail support 20 supporting the second arm 58 moves very little. In this manner, the rotation of the extension bar 50 is facilitated.

Due to the length $D_1$ of the slits 16 between the side walls 17' in which the projections 28 of the rail supports 20 engage as well as the independent movement of each rail support 20, the extension bar 50 can achieve a wide range of motions as well as different position to ensure that proper alignment of the ball 11 of the hitch 13 with the coupler of the trailer, or other towed vehicle. The extension bar 50 may be fully extended and then rotated to help achieve the alignment or may be rotated in either direction $V_1$, $V_2$ as it is being extended. At the same time, due to the placement of the frame 12 and rail supports 20 as well as the shape of the horseshoe shaped extension bar 50, the spare tire which is located within the undercarriage of many vehicles does not interfere with the range of motion of the extension bar 50.

Due to the sturdy design of the rail supports 20, the extension bar 50 and the frame 12, the extension bar 50 of the towing device 10 can be extended a greater distance than with rotatable trailer hitches, thereby increasing the perimeter of proximity in which the towing vehicle needs to be in order to facilitate alignment of the trailer hitch 13 and coupler. For this reason, the need for proximity of the trailer hitch to the coupler of the trailer, or other towed vehicle, is lessened. In such a design, as long as the trailer hitch is at a distance from the coupler that is within the extendable and rotatable length of the extension bar, the trailer hitch can be brought into alignment with the coupler of the trailer, or other towed vehicle. At the same time, the extension bar is well supported, while permitting a wide range of movement.

Once the coupler is fastened to the ball 11 of the trailer hitch 13 in the present exemplary embodiment, a drive unit 30 may be used to retract the extension bar 50 into a towing position. In the shown embodiment, the drive unit 30 is made up of a winch and pulley system. A winch 36 which may be disposed on the frame 12, or some other portion of the vehicle 100, is provided. Cabling 34 is wrapped around the winch 36 and can extend therefrom. The extension bar 50 defines a hollow space therethrough that forms an opening 52 at either of the ends of the arms 56 and 58. The hollow space extends through the extension bar 50 from one arm through the next. The cabling 34 extends into the opening 52 of the first arm 56 of the extension bar 50 through the extension bar 50 and out of the opening 52 of the second arm 58. The cabling 34 wraps around a pulley 32 and extends back into the opening 52 of the second arm 58 up to the crown 55 of the extension bar 50 where the cabling is attached at a connection point 33.

To relieve the friction between the inner walls of the extension bar 50 and the cabling 34, guiding rods 38 are placed within the hollow space of the extension bar 50 with the cabling 34 extending around guiding rods 38 to alleviate contact of the cabling 34 against the inner walls of the extension bar 50 when the drive unit 30 is activated. In this manner, when the winch 36 starts to wind the cabling 34, the amount of contact between the cabling and the extension bar 50 is greatly lessened, thereby greatly decreasing the amount of power needed to retract the extension bar 50 back to a towing position.

In such an embodiment, the extension bar 50, and thereby the trailer hitch 13, may be pulled out to an extended position for alignment with the coupler by unlocking the winch 36 to allow the cabling 34 to unravel freely as the extension bar 50 is extended and/or rotated. In this manner, the extension bar 50 may be extended and rotated manually. Once the coupler is attached to the trailer hitch 13, the winch 36 may be activated to wind the cabling 34 back onto the winch 36. As the cabling 34 is wound onto the winch 36, the extension bar 50 is pulled back into a towing position along with the trailer, or towed vehicle, which is attached to the hitch 13 located on the extension bar 50. Due to the configuration of the rail supports 20 and the frame 12, as the cabling 34 is wound onto the winch 36, the cabling 34 pulls the extension bar inward sliding the engagement devices 54 along the slots 24 of the rail supports 20. Thereby, the extension bar 50 is pulled in until the ends of the first arm 56 and the second arm 58 abut against stops 26 disposed on the rail supports 20. Upon contact of the first arm 56 and the second arm 58 against the respective stops 26, the extension bar 50 will be located on a proper towing position.

Due to the configuration of the frame 12 and the rail supports 20, the extension bar 50 will always be brought back into proper alignment for its towing position no matter how the extension bar 50 is extending and/or rotated. This is due to the rail supports 20 being securably attached to the undercarriage 18 of the vehicle 100 at the pivot points 22 at the second ends 25. Since the arms 56 and 58 of the extension bar 50 are at a fixed distance which corresponds to the distance between the two rail supports 20, as the ends of the arms 56 and 58 where the engagement devices 54 are attached approach the pivot points 22 and the stops 26 of the rail supports 20, the crown 55 of the extension bar 50 from which a tongue 53 with trailer hitch 13 attached thereto extends is forced to align in the center of the frame 12. At this point, a securing mechanism 40 may be engaged to secure the extension bar 50 to the frame 12 in a towing position as shown in FIG. 4.

Figure 8:
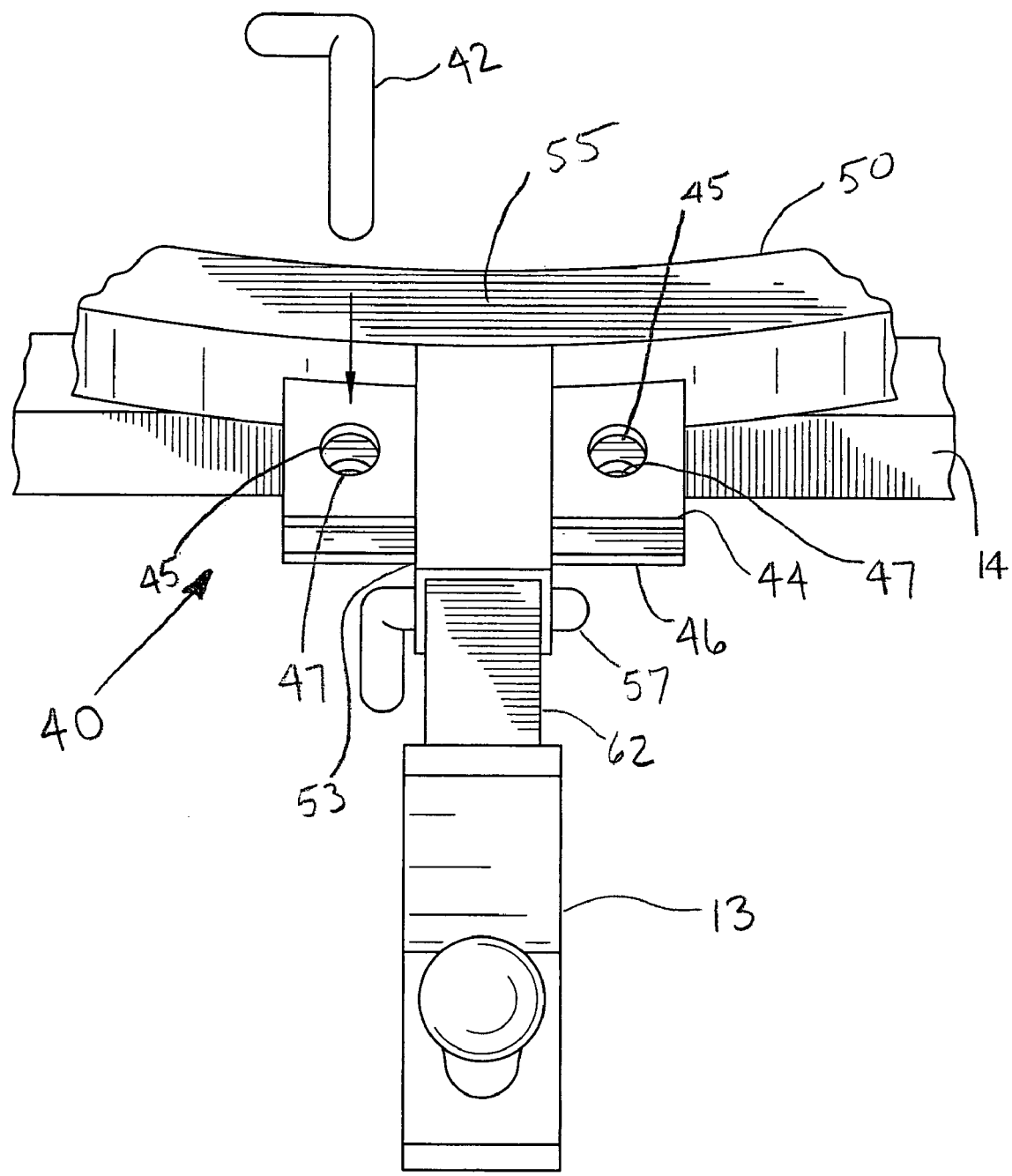
FIG. 8 shows a securing mechanism employed on the towing device as shown in FIG. 1.

In the embodiment shown, the securing mechanism 40 includes a frame securing plate 46 and extension bar securing plate 44 and a securing pin 42, which engages apertures in both the securing plate 44 and 46 as shown in FIG. 3. FIG. 8 shows a more detailed drawing of the securing mechanism 40. In FIG. 8, the extension bar 50 is in proper towing alignment and rests atop the support bar 14 of the frame. Located at the crown 55 of the horseshoe shaped extension bar 50, the tongue 53 extends outward. The trailer hitch has a back portion 62 which is insertable into the tongue 53. Both the tongue 53 and the back portion 62 of the trailer hitch 13 have orifices therethrough that may be aligned so that a pin 57 may be inserted to secure the trailer hitch 13 to the tongue 53. In this manner, the trailer hitch extends outwardly from the crown 55 of the horseshoe shaped extension bar 50.

When the extension bar 50 is in proper towing position, apertures 45 in the extension bar securing plate 44 align with apertures 47 in the frame securing plate 46. Once such proper alignment is made, a securing device such as pin 42 may be inserted through one or both sets of aligned apertures 45, 47. Any type of securing device such as a lock, cotter pin, bolt, or the like, may be inserted through the apertures 45 and 47 when they align as long as the securing device is sturdy enough to withstand the force placed on it due to the pulling and towing of the towed vehicle. For this reason, the pin 42 may be of varying sizes depending on the expected towing capabilities of the towing vehicle 100. Other securing mechanisms may also be employed such as a spring lock, latch system or the like as long as it is strong enough to withstand the forces generated by the towing.

Such a designed towing device has the advantage of being sturdy enough to haul almost any size trailer, or other towed vehicle, without fear of catastrophic failure due to the forces generated by the towing. At the same time, the perimeter of proximity of the towing vehicle to the coupler of the towed vehicle needed for facilitating alignment is greatened as compared to trailer hitch designs or other towing devices. Therefore, less time has to be spent to get the trailer hitch close in proximity to the coupler of the trailer or other towed vehicle.

Figure 17:
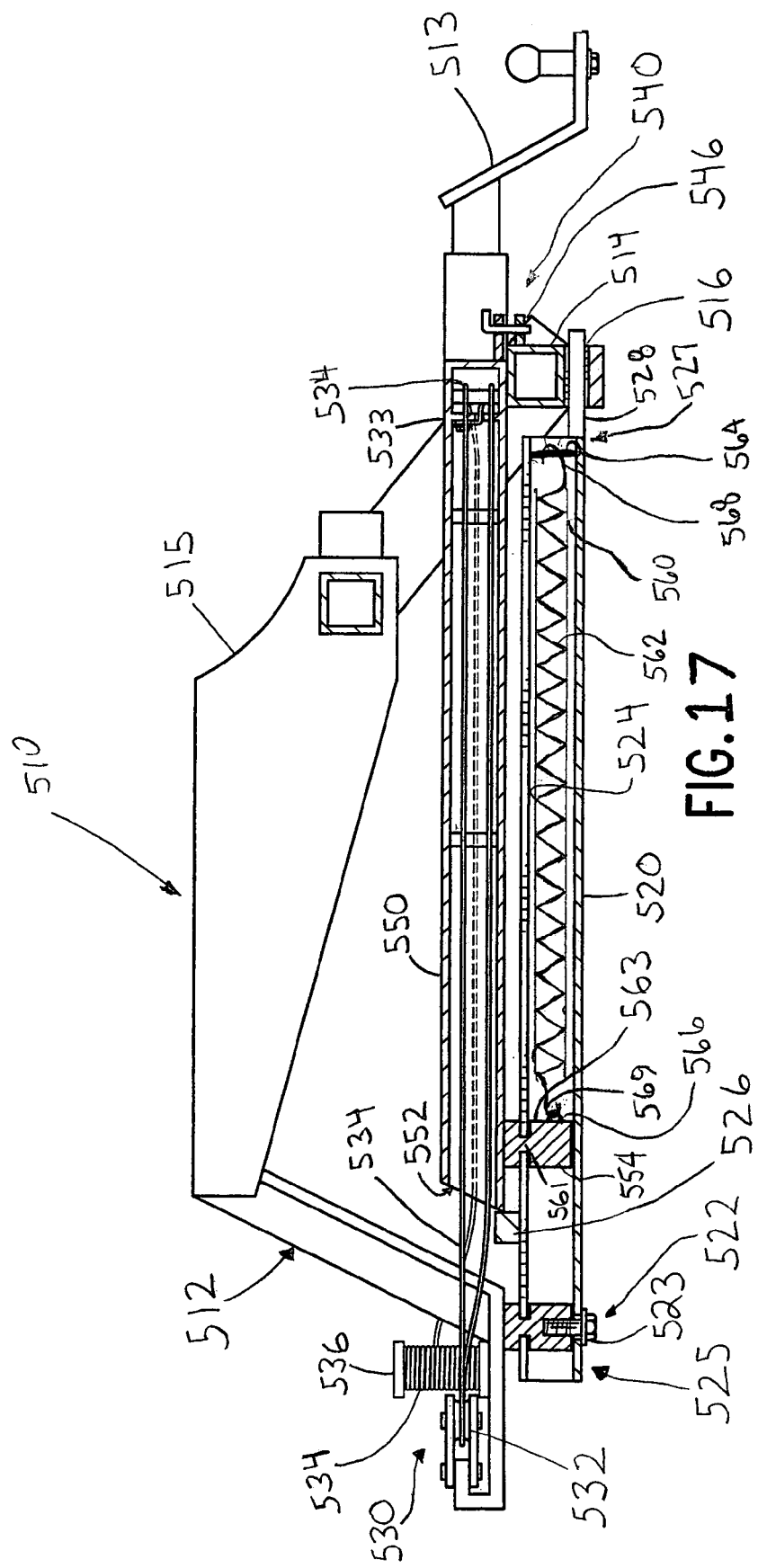
FIG. 17 shows a partial cross-sectional view of a further alternate embodiment of a towing device of the present subject matter

FIG. 17 shows a similar embodiment of a towing device, generally 510, to the embodiment depicted in FIGS. 1–8. The towing device 510 includes a frame 512 having a horse-shaped extension bar 550 with a trailer hitch 513 extending therefrom. The frame 512 has a support bar 514 on which the horse-shaped extension bar 550 rests to help support the horse-shaped extension bar 550 both when the extension bar 550 is in its towing position or when the extension bar is extended. Frame 512 also includes connection members 515, which are securable to the undercarriage of a vehicle.

To further support the extension bar 550 and to facilitate the extendibility and rotatability of the extension bar 550, two support rails 520 are provided which movably engage the support bar 514 and are rotatably securable to the undercarriage of the vehicle. Each of the rail supports 520 possesses a first end 527 and a second end 525. The first ends 527 of the rail supports 520 have projections 528 which extend into slits 516 of the support bar 514 to movably engage the frame 512. The second ends 525 of the rail supports 520 may be rotatably secured to the undercarriage of the vehicle creating pivot points 522. The pivot points 522 may be formed by a connection device 523 engaging each of the second ends 525. Such construction of the rail supports 520 at the second ends 525 permits the first ends 527 to rotate about the second ends 525 by having the projections 528 at the first ends 527 inserted into the slits 516 of the support bar 514.

A portion of each rail support 520 defines a slot 524, which at least partially runs laterally between the first end 527 and the second end 525 of the corresponding rail support 520. Further, each rail support 520 defines a hollow channel 560 defined therein. The extension bar 550 has engagement devices 554 attached thereto that interact with the rail supports 520 by engaging the slots 24 with a portion riding in the hollow channel 560. Each of the engagement devices 554, which may be a roller, knuckle, or the like, may have a wider bottom portion 563 that fits into the hollow channel 560 of the rail support 520, while a neck portion 561 rides along the slots 24 in the rail support 520. The engagement devices 554 may slide along their respective slots 524 of the corresponding rail supports 20 to allow the extension bar 550 to be extend.

A drive unit 530 positioned on or proximal to the rear of the frame 512 may be used retract the extension bar 50 into a towing position. As with an earlier embodiment, the drive unit 530 is made up of a winch and pulley system. A winch 536, which may be disposed on the frame 512 or some other portion of the vehicle, has cabling 534 wrapped around it that can extend therefrom. The extension bar 550 defines a hollow space that extends through the extension bar 550 from one arm through the next. The cabling 534 extends into an opening formed by the hollow space of the arm of the extension bar 550 closest to the winch 536 through the extension bar 550 and out of the opening 552 of the second arm. The cabling 534 wraps around a pulley 532 and extends back into the opening 552 of the second arm up to the crown of the extension bar 50 where the cabling is attached at a connection point 533.

The winch 536 may be unlocked to allow the cabling 534 to unravel freely as the extension bar 550 is extended and/or rotated. To assist the movement of the extension bar 550, the rail supports 520 and the engagement devices 534 may be lubricated where they engage. Further, within the hollow channel 560 of each rail support 520, an elastic member 562 may be attached between a portion of that rail support 520 near the first end 527 and the bottom portion 563 of the engagement device 554 to facilitate the extension of the extension bar 550 from the frame. In this manner, the extension bar 550 may be more easily extended and rotated manually.

In the embodiment shown, the elastic members 562 are coiled springs, but other types of conventional elastic devices may be used such as industrial rubber bands, bungee cord material, or other types of springs. The coiled springs 560 have hooks 568, 569 on either end. In the portion of the towing device 510 shown in FIG. 17, the hook 568 hooks onto a bar 564 attached within the rail support 520 near the first end 527, while the hook 569 hooks onto a connection loop 566 on the bottom portion 563 of the engagement device 554. Other methods and configurations for attaching the spring between the engagement device 554 and the rail support 520, which are conventional known, may be used. Further, other configurations using other elastic devices may also be used. For example, blocks of resilient sponge like plastic or springs may be placed between the connection devices 523 and the engagement devices 554. The blocks or springs are compressed when the extension bar 550 is in its towing position. Once the extension bar 550 is ready to be extended, the compressed blocks or springs facilitate the extension. Such variations and modifications are within the scope and spirit of the present subject matter.

The length of the springs 562 are such that, at free length (the overall length of a spring at resting position), the extension bar 550 is at least partly extended. Thus, when the winch 536 winds up the cabling 534, the springs 562 are stretched and under tension. When the winch 536 is unlocked and the cabling 534 is free to unravel, the spring should aid the user in extending the extension bar. Once the coupler is attached to the trailer hitch 513, the winch 536 may be activated to wind the cabling 534 back onto the winch 536. The winch 536 stops winding the cabling 534 when the ends of the arms of the extension bar 550 abut against stops 526. At this point, the extension bar 550 is in towing position and thus the springs 562 are at least slightly extended under tension. During times when no vehicle is being towed, the winch 536 may stay in a locked position to prevent the springs 562 from overcoming the force of friction and accidentally extending the extension bar 550. Further, a securing mechanism 540 that locks the towing device 510 in towing position will prevent the extension of the extension bar 550, if the winch 536 fails or becomes unlocked.

The rate of load per unit of deflection for the springs 562 should be such that the springs 562 facilitate the extension of the extension bar 550 when freed by the drive unit 530, but not so stiff so as to hinder the rotation of the extension bar 550 when manually trying to obtain an alignment of the trailer hitch 513 and the coupler of a towed vehicle. The same is true for other types of elastic devices and configurations contemplated. In this manner, the use of the elastic members 562 can be helpful in easing the amount of force required to extend the extension bar 550 without becoming a hindrance to the alignment of the trailer hitch 513 of the towing device 510 with the coupler of the towed vehicle.

Figure 9:
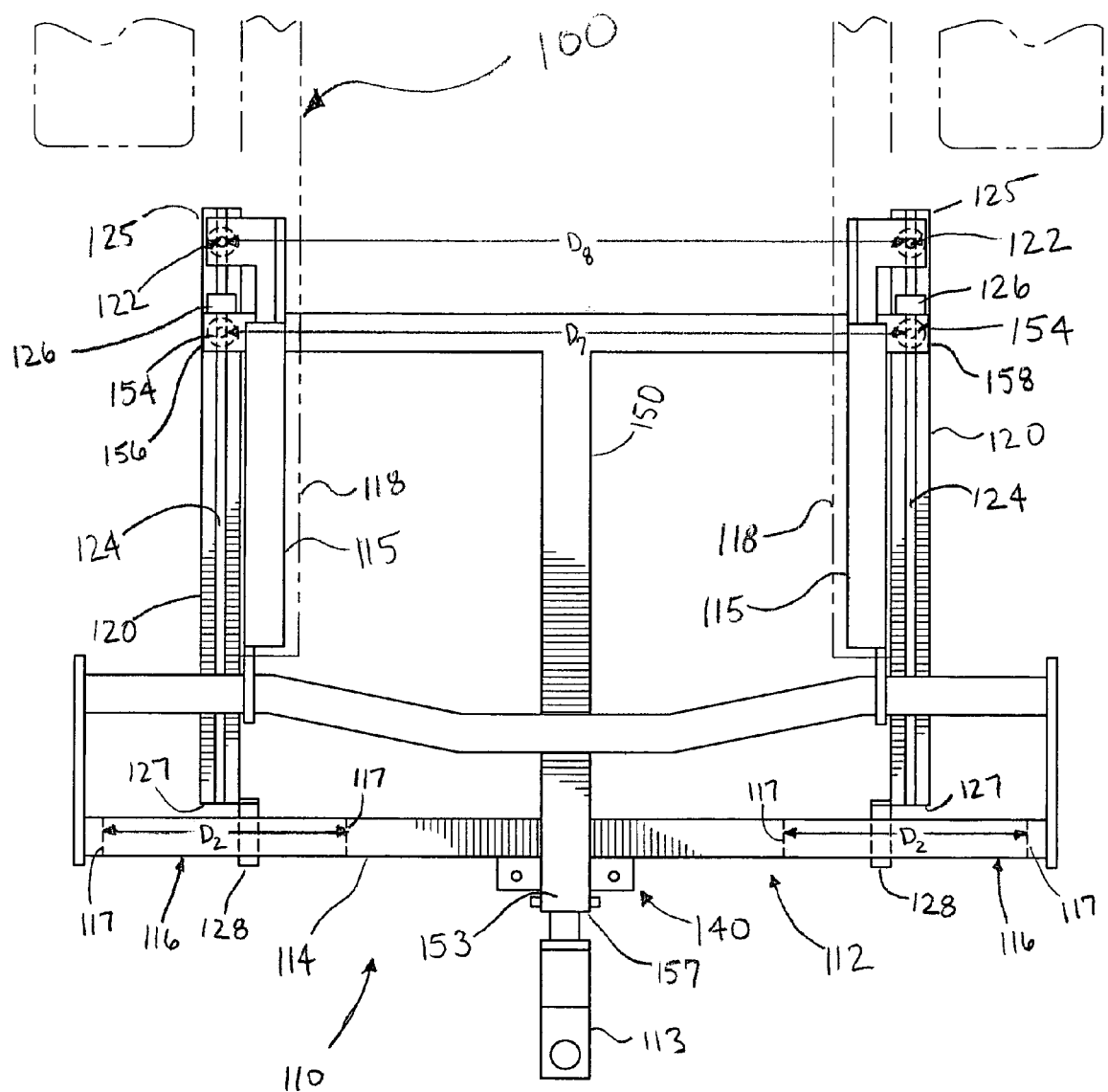
FIG. 9 shows a top view of an alternate embodiment of a towing device in a towing position according to the present subject matter.

FIG. 9 shows another exemplary embodiment of a towing device, generally 110. The towing device 110 includes a frame 112 which may be attached to an undercarriage 118 of a vehicle 100 through connection members 115. Connection members 115 may be welded to the undercarriage 118 or may be bolted, riveted or mechanically fastened in another manner. The towing device 110 also includes a T-shape extension bar 150 that has a first parallel end 156 and a second parallel end 158 from which engagement devices 154 extend that engage a corresponding rail support 120. A perpendicular end 157 of the T-shaped extension bar 150 is positioned outward from the frame forming a tongue 153 on which a trailer hitch 113 may be carried.

In the embodiment shown, the perpendicular section of the T-shaped bar rests upon a support bar 114 of the frame 112. The support bar 114 defines apertures, or slits, 116 therein between the side walls 117. Each slit 116 has a length $D_2$. The rail supports 120 each have a first end 127 that is rotatable around a second end 125 that is securably attached to the undercarriage 118 of the vehicle 100 at pivot points 122. The rail supports 120 are positioned so that, when the rail supports 120 are parallel to each other and perpendicular to the support bar 114, projections 128, which extend from the first end 127 of the support rails 120, are positioned within the slits 116 of the support bar 114. Advantageously, when the rail supports 120 are in such a position the projections 128 should be located about centered in the length $D_2$ of the slits 116. The rail supports 120 each form a slot 124 which is engaged by the engagement devices 154 located at the first parallel end 156 and the second parallel end 158 of the T-shaped extension bar 150.

Figure 10:
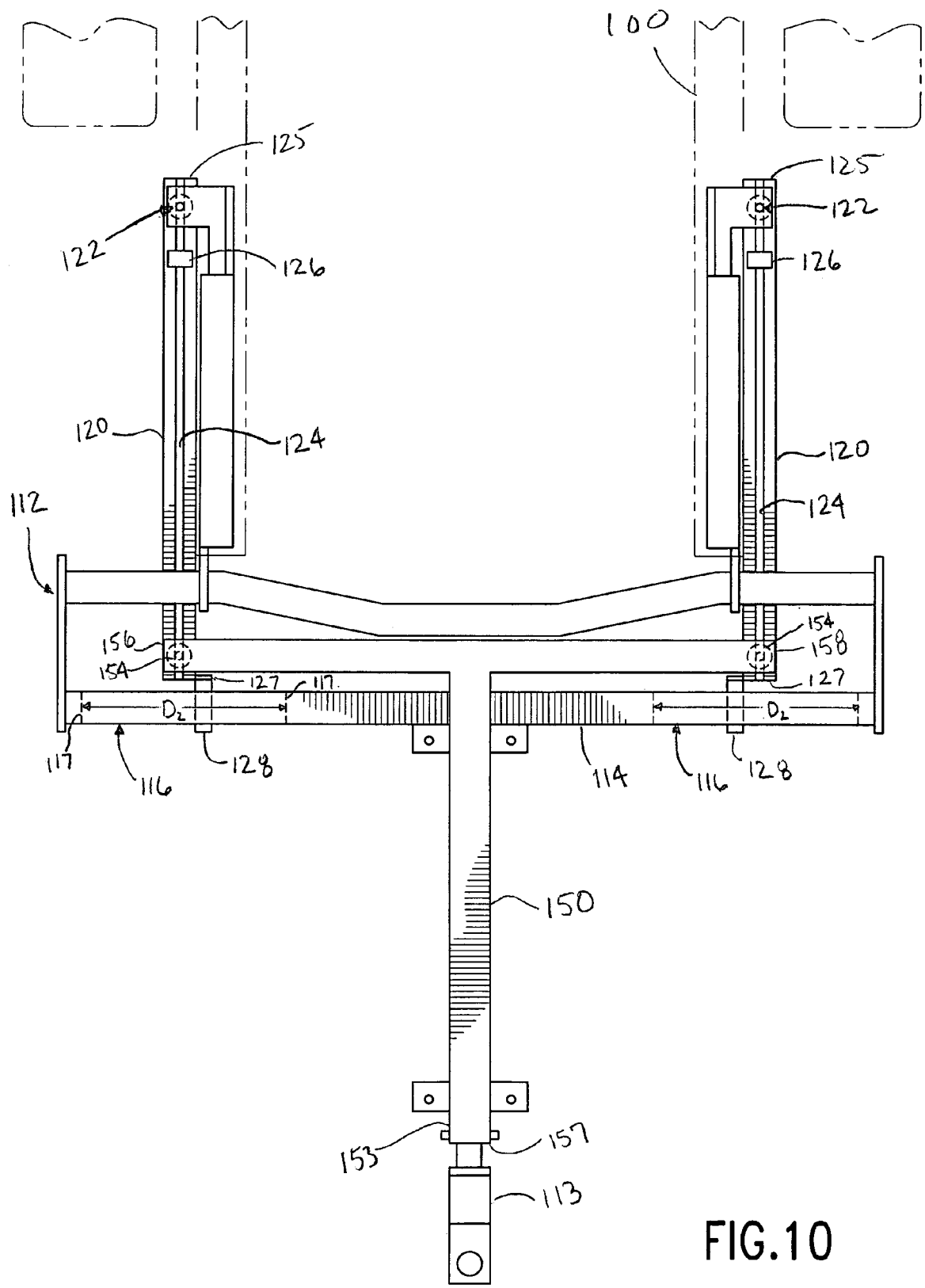
FIG. 10 shows a top view of the towing device shown in FIG. 9 with an extension bar in an extended position.
Figure 11:
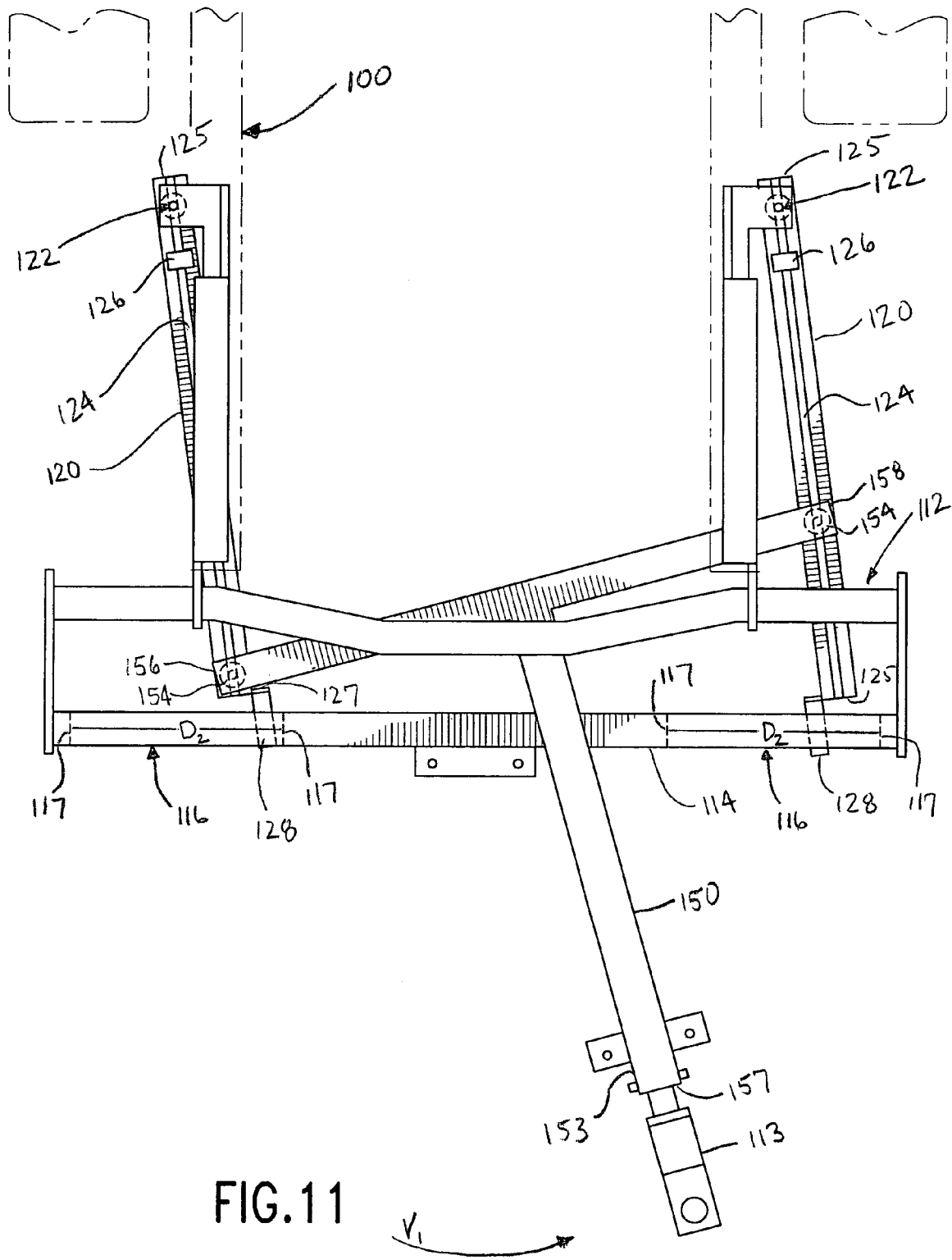
FIG. 11 shows a top view of the towing device shown in FIG. 9 with the extension bar extended and rotated to a first side.
Figure 12:
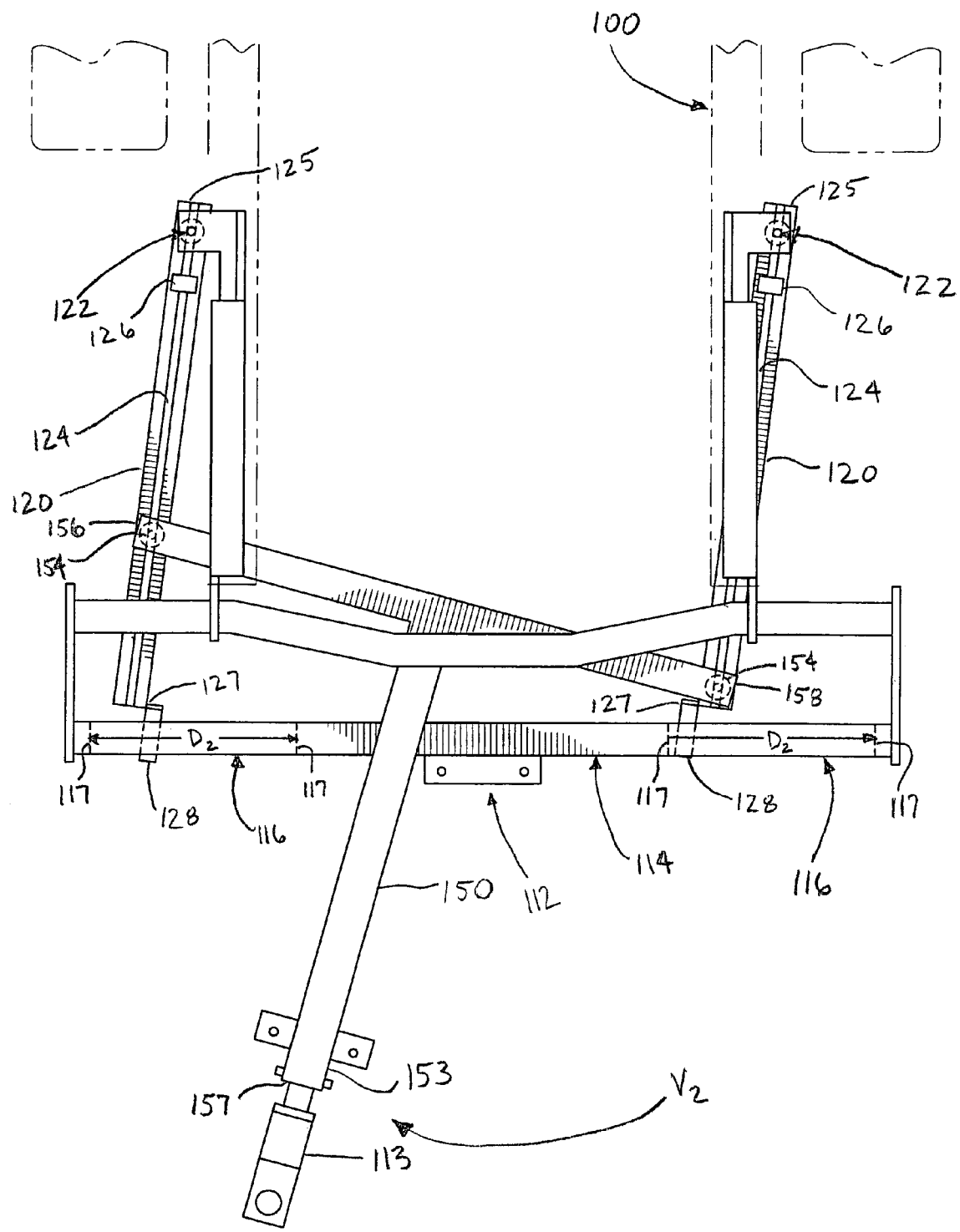
FIG. 12 shows a top view of the towing device as shown in FIG. 9 with the extension bar extended and rotated to a second side.

Through the attachment of the frame 112 to the undercarriage 118 of the vehicle 100 as well as the attachment of the rail support 120 to the undercarriage 118 and its interaction with the frame 112, the T-shaped bar 150 is supported. As seen in FIGS. 10–12, the engagement devices 154 may slide along the corresponding slots 124 of the rail supports 120, so that the extension bar 150 may be extended as well as rotated in both a direction $V_1$ as well as a direction $V_2$. FIG. 10 shows the T-shaped extension bar 150 in an extended position with the engagement devices 54 on both the first parallel end 156 and the second parallel end 158 slid up the slots 124 toward the frame 112 so that the perpendicular end 157 extends outward from the frame. The extension bar 150 is supported by both the rail supports 120 and the support bar 114.

In FIG. 11, the extension bar 150 with the trailer hitch 113 extending from the perpendicular end 157 is turned in a direction $V_1$. As described with the horseshoe shaped extension bar from FIGS. 1–7, the rail supports 120 in the FIGS. 9–12 also rotate independently of each other to allow the extension bar to be rotated from side to side. The rotation of the rail supports 120 about the corresponding pivot pints 122 at the second ends 125 are caused by the interactions of the engagement devices 154 with the corresponding slots 124 of the respective rail supports 120. By having the projections 128 able to float across the distance $D_2$ of the slits 116, the extension bar 150 is able to rotate in order to allow the trailer hitch 113 to align properly with a coupler of a trailer, or other towed vehicle. As shown in FIG. 11, as the extended extension bar 150 is rotated in a direction $V_1$, the engagement device 154 on the first parallel end 156 pushes the corresponding rail support 120 and projection 128 toward a side wall 117 close to the middle of the frame 112 in the slit 116. At the same time, the engagement device 154 on the second parallel end 158 slides down the slot 124 of its corresponding rail support 120 and forces the rail support 120 to rotate around its pivot point 122 so that the projection 128 moves slightly toward the outside side wall 117 of its corresponding slit 116.

Conversely, if the extended T-shaped extension bar 150 is rotated in a direction $V_2$ as shown in FIG. 12, then the engagement device 154 of the second parallel end 158 forces the corresponding rail support 120 to rotate around its pivot point 122 so that the projection 128 moves to within close proximity of a side wall 117 of the slit 116 toward the inner portion of the frame 112. The engagement device 154 of the first parallel end 156 slides down the slot 124 of the corresponding rail support 120 forcing it to rotate around the pivot point 122 so that the projection 128 of that rail support 120 moves slightly off center toward the outside wall 117 of its corresponding slit 116.

In this embodiment shown in FIGS. 9–12, the T-shaped extension bar 150 can be extended and rotated to properly align and attach the trailer hitch 173 with the coupler of the trailer, or other towed vehicle, for towing purposes. In such an embodiment, once the coupler is securely attached to the ball 111 of the trailer hitch 113, the towing vehicle 100 may be used to align extension bar 150 into a towing position as shown in FIG. 9. For example, the towing vehicle 100 may be put in reverse to facilitate alignment of the extension bar 150 into the towing position. As it is driven slowly in reverse, the engagement devices 154 of the extension bar 150 slide back down the slots 124 of the rail supports 120 to stops 126 proximal to the second ends 125, which are securely attached to either the frame 112 or the vehicle 100. Upon the first end 156 and the second end 158 encountering their respective stop 126, the extension bar 150 will be retracted to its proper towing position as shown in FIG. 9 and the securing mechanism 140 may be engaged to secure the extension bar 150 to the frame 112 for towing of the attached trailer, or other towed vehicle. In this manner, a cheap but effective towing device 110 can be manufactured without the expense of adding a drive unit to drive it. The manual device, while requiring a certain amount of labor, still accomplishes the same goal of not requiring exact alignment of the trailer hitch 113 with the coupler of a trailer, or other towed vehicle.

The T-shaped extension bar 150 is for use on vehicles which do not have a spare tire or other portion of the undercarriage which may interfere with the use of such a towing device at the rear end of the vehicle. The sturdy construction and support provided by the rail supports 120 and the support bar 114 allow the T-shape extension bar to be extendable and rotatable at a greater distance from the vehicle.

Figure 13:
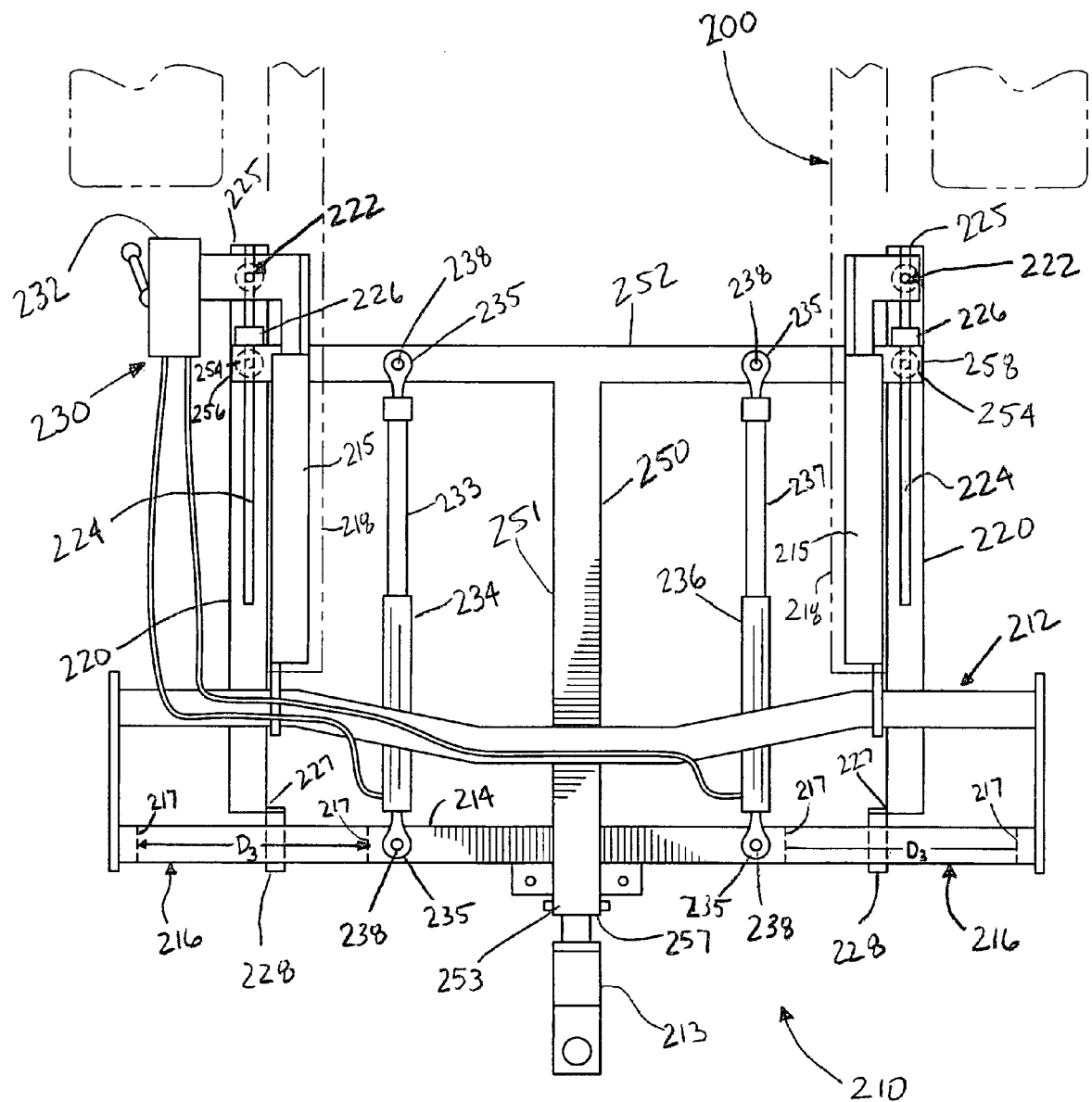
FIG. 13 shows a schematic top view of another alternate embodiment of a towing device in a towing position according to the present subject matter.
Figure 14:
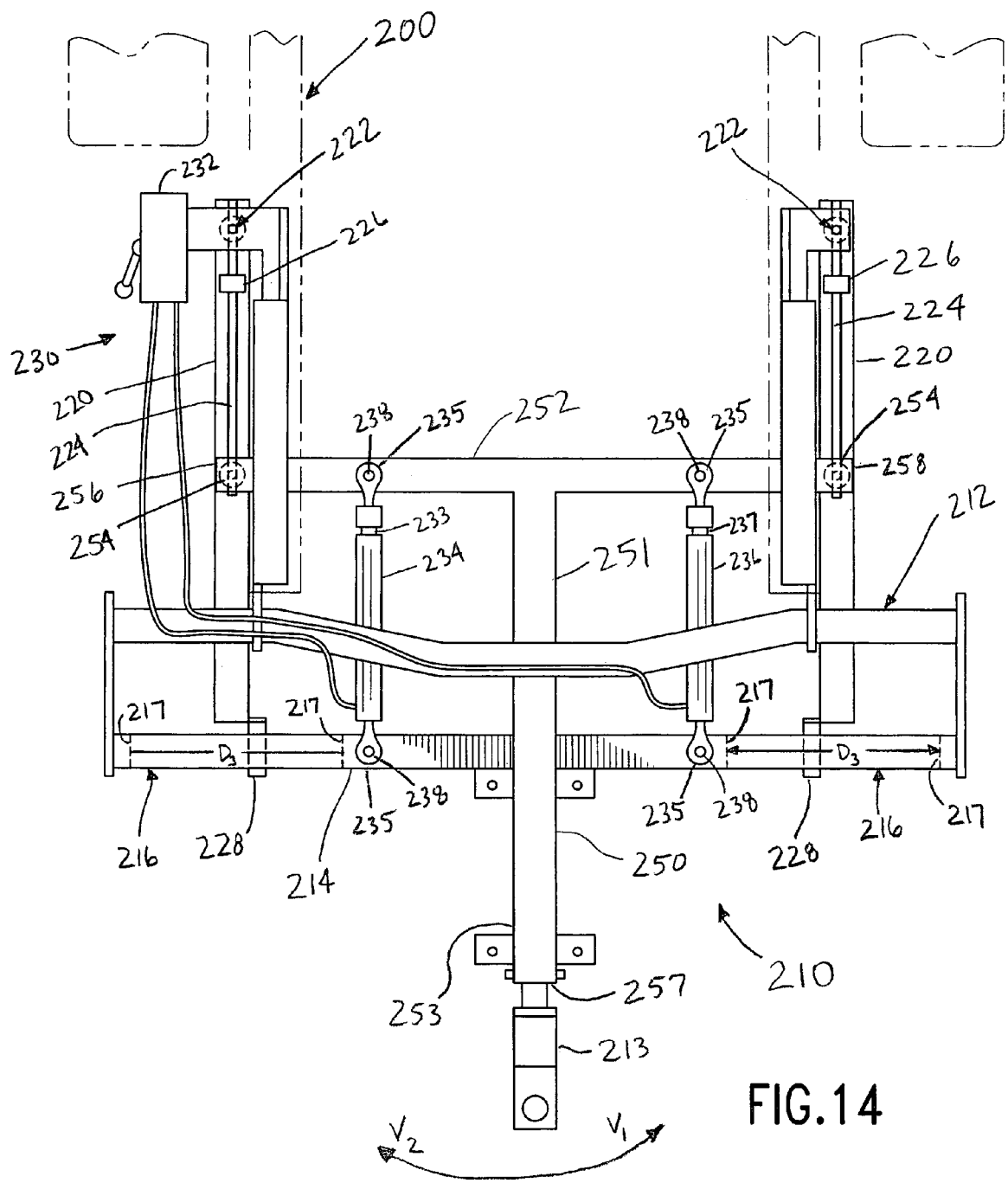
FIG. 14 shows a schematic top view of the towing device shown in FIG. 13 with an extension bar in an extended position.

FIG. 13 and 14 show a further embodiment of a T-shaped extension bar 250 which may be controlled by a drive unit 230 to both extend and retract the extension bar 250 on a towing device, generally 210. A frame 212 is provided which may be attached to an undercarriage 218 of a vehicle 200. The frame 212 may have a support bar 214 which forms slits 216 on either side of the center of the support bar 214. Rail supports 220 which are securably and rotatably attached at second ends 225 to either the frame 212 or the undercarriage 218 of the vehicle 200 movably engage the slits 216 of the support bar 214 at first ends 227 of the rail supports 220. Projections 228 extend into the slits 216 which have a length $D_3$ between the side walls 217. The extension bar 250 has a first parallel end 256 and a second parallel end 258 that have engagement devices 254 that engage slots 224 defined in the rail supports 220, respectively. The extension bar 250 is supported by the rail supports 220 and the support bar 214 of the frame 212. A drive unit 230 is attached to both the frame 212 and the T-shaped extension bar 250.

The drive unit 230 may be a hydraulic system or a pneumatic system which employs cylinders, such as cylinder 234 and 236. A control unit 232 may be used to control the movement of extension rods 233 and 237 of the cylinders 234 and 236, respectively.

Each of the cylinders 234, 236 is operably connected to the frame by an eye rod 235 having a connection device 238, such as a rivet, bolt, or some other device extending therethrough which allows the eye rod 235 to rotate about the connection device 238. The cylinders 234, 236 are also connected to the T-shaped extension bar 250 by an eye rod 235 attached to each of the connecting rods 233, 237. The eye rods 235 on the connecting rods 233, 237 are held to the T-shaped extension bar 250 by other connection devices 238. In the embodiment shown, the eye rod 235 extending from the connection rods 233, 237 are rotatably secured to a first bar member 252 which form the first parallel end 256 and the second parallel end 258 and are positioned on either side of a second bar member 251, which extends perpendicular to the first bar member 252 and forms the perpendicular end 257. Similar to previously describe embodiments, the rail supports 220 rotate around their free ends 225 about pivot points 222 independently of each other based on the movement of the extension bar 250 by the cylinders 234, 236 of the drive unit 230.

The control unit 230 is manipulated to extend the cylinders 234, 236 separately as well as in conjunction with one another to allow the extension bar 250 to extend outward from the frame 212 as well as rotate in the directions $V_1$ and $V_2$ by independently pulling or pushing on the bar member 252 of the T-shaped extension bar 250 by the extending and retracting of the connecting rods 233, 237. In the extended position of the connecting rods 233 and 237, the extension bar 252 is in a towing position as shown in FIG. 13. As the connecting rods of 233 and 237 are retracted into the cylinders 234 and 236, respectively, the extension bar 250 is extended outward. The pulling of the extension bar 250 forward by the retraction of the connecting rods 233 and 237 cause the engagement devices 254 at both the first parallel end 256 and the second parallel end 258 to slide along slots 224 in the corresponding rail supports 220. Depending on how the control unit 230 extends or retracts each of the connecting rods 233 and 237, the engagement devices 254 will slide up and down the slots 224 and, at the same time, cause the rail supports 220 to rotate around the pivot points 222 at the second ends 225, while the first ends 227 rotate freely as the projections 228 slide along the slits 216 in the support bars 214. In this manner, the perpendicular end 257 and the trailer hitch 213 may rotate in either direction $V_1$ or $V_2$.

For example, if the connecting rod 237 of the cylinder of 236 is retracted while the connecting rod 233 is in a more extended position, the rail support 220 supporting second parallel end 258 will rotate around its pivot point 222 so that its first end 227 rotates inwards with the projection 228 sliding along the slit 216 toward the center of the frame 212 as the engagement device 254 of second parallel end 258 slides up the corresponding slot 224 in the rail support 220. At the same time, the rail support 220 supporting the first parallel end 256 of the extension bar 250 may be slightly shifted so that the projection 228 slides away from the center of the frame 212. In this manner, the perpendicular end 257 of the extension bar 250 as well as the trailer hitch 213 rotates in a direction $V_2$. A similar action will occur if the connecting rod 233 is retracted into a cylinder 234 with the extension rod 237 extended. In such a case, the perpendicular end 257 and the trailer hitch 213 would rotate in a direction $V_1$.

Through the use of the control unit 230, the cylinders 234, 236 may be manipulated to extend and rotate the extension bar 250 with a trailer hitch 213 attached thereto in various manners to allow the trailer hitch 213 to be aligned with a coupler of a trailer, or other towed vehicle. At such point in time when the coupler is secured to the trailer hitch 213, the cylinders 234, 236 may be extended so that the extension bar 250 is pushed against the stops 226 thereby aligning the extension bar 250 with the frame 212 in a towing position. In such an embodiment, stops 226 may not be necessary. Instead, the natural limitations of the extension of the connecting rods 233 and 237 may act in properly aligning the extension bar 250 in a towing position.

The ability of the cylinders 234 and 236 to rotate the extension bar 250 in directions $V_1$ or $V_2$ are enabled by the rotatability of the eye rods 235 around the connection devices 238. By allowing the rotation of the eye rods 235 around the connection devices 238, the cylinders 234, 236 can extend and retract independent of one another thereby allowing a full range of motion of the extension bar 250.

Once the extension bar is brought back into a towing position, a securing mechanism 240 may be engaged to secure the extension bar to the frame for towing of the trailer, or other towed vehicle. However, in some embodiments, it may be possible that the cylinders may be locked in an extended position thereby holding the extension bar in its towing position while the trailer, or other towed vehicle, is being towed if the cylinders are strong enough for such a use. In other embodiments, the securing mechanism and the cylinders may be used in conjunction to ensure that the extension bar 250 stays in a towing position.

In similar embodiments, the cylinders may be attached to the undercarriage of the vehicle 200 instead of being attached to the frame. In such embodiments the cylinders may work conversely to extend and rotate the extension bar. The cylinders would extend the connecting rods to extend the extension bar and retract the connecting rods to retract the extension bar.

Figure 15:
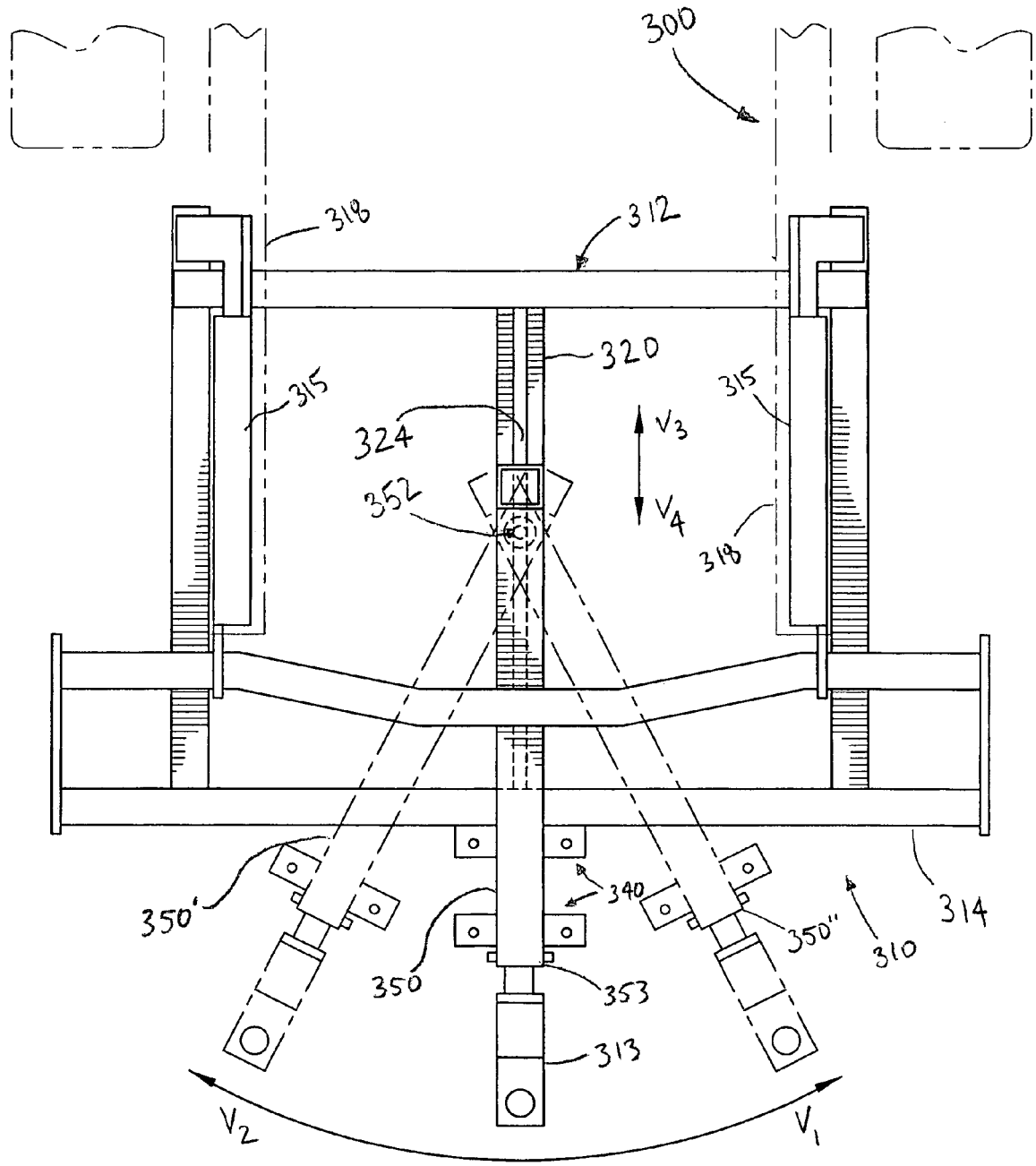
FIG. 15 shows a schematic top view of a further embodiment of a towing device according to the present subject matter.

FIG. 15 shows a further embodiment of a towing device. A towing device, generally 310, is provided with a frame 312 and an extension bar 350. Instead of having two parallel rail supports which are engaged by an extension bar, in the embodiment shown in FIG. 15, a single rail support 320 is provided which is affixed to the frame in a central position. As before, the rail support 320 may form a slot 324 therein which is engaged by an engagement device 352 attached to the extension bar 350 that also acts as a pivot point for the extension bar 350. The engagement device 352 can slide up and down the slot 324 in directions $V_3$ and $V_4$, while at the same time allowing the extension bar 350 to rotate in directions $V_1$ and $V_2$ into positions 350' and 350" to allow the trailer hitch 313 to be aligned properly with a coupler of a trailer, or other towed vehicle, that is in close proximity. With such a design, some kind of drive unit may be employed, like a hydraulic or pneumatic system which has a cylinder for longitudinal extension and retraction in the directions $V_3$ and $V_4$ as well as a cylinder that aids in latitudinal movements to create the moving of the extension bar 350 in the directions $V_1$ and $V_2$. Such a system is especially advantageous to ensure proper alignment of the extension bar 350 in its towing position so that a securing mechanism 340 may be activated to allow for proper towing. In such an embodiment, the frame 312 is securely attached the undercarriage 318 of the vehicle 300 as shown in the embodiment. Connection members 315 may be used to attach the frame 312 to the undercarriage 318.

In similar embodiments, a straight extension bar, like extension bar 350, may be used in conjunction with a rail support which movably engages a frame on a first end, while being securely and rotatably connected on a second end to the undercarriage of a vehicle or to the frame of the towing device. By having the first end of the rail support movably engaging the frame, the extension bar may engage the rail support in such a manner that it only extends out from the rail support. For example, two aligned engagement devices may engage a slot in the rail support so that the extension bar does not rotate about the rail support. Since the rail support movably engages the frame then in such an embodiment the extension bar which extends straight out from the rail support may still rotate as the rail support rotates about its pivot point at its second end.

Different engagement devices may be used in conjunction with these different embodiments of the towing devices. For example, instead of the roller or knuckle for an engagement device which interacts with a slot in the rail support, a sleeve or collar may act as an engagement device which loosely surrounds the rail support and can slide thereon. Other such engagement devices may be used with fall within the scope of the present subject matter.

Figure 16:
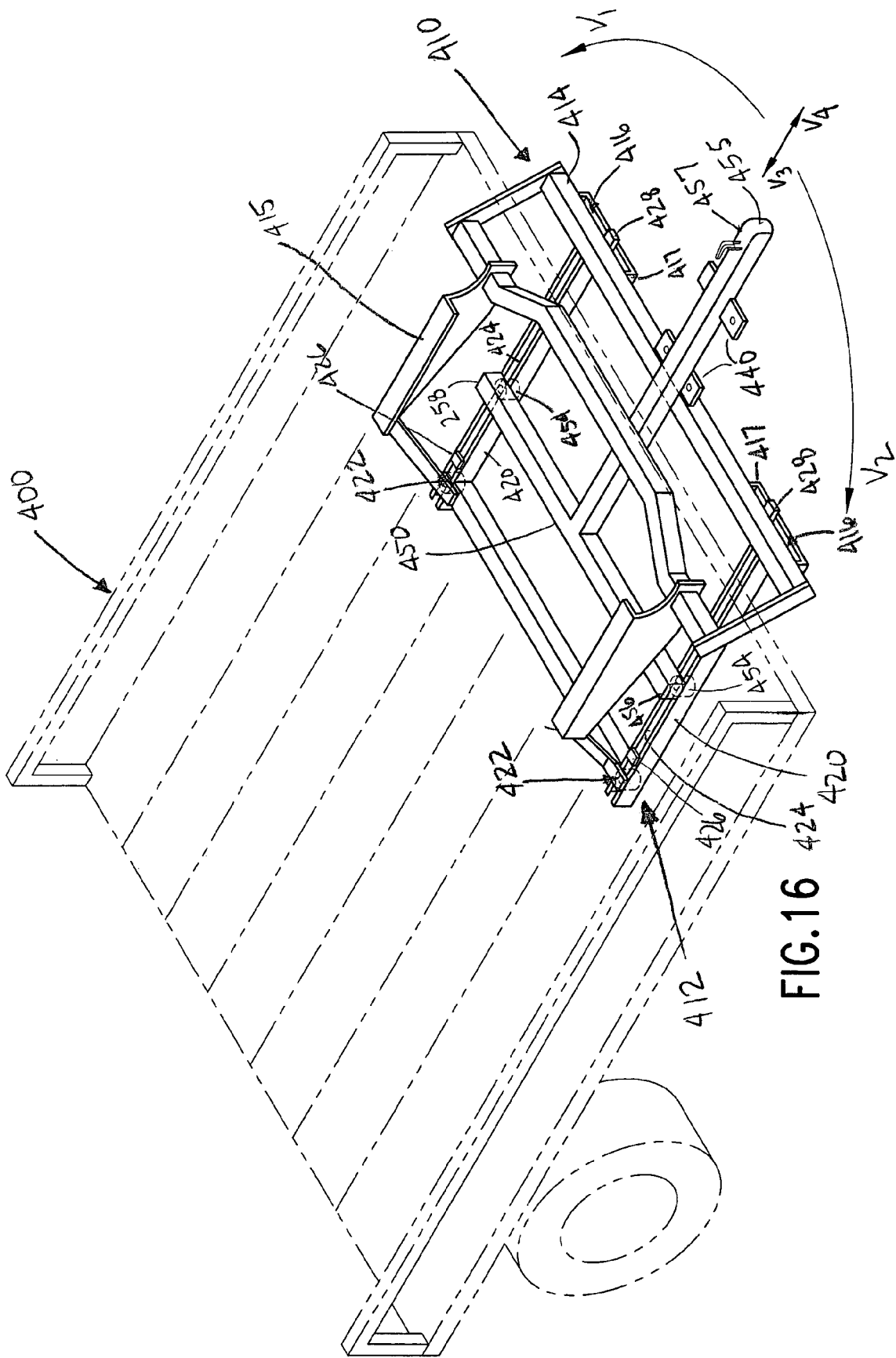
FIG. 16 shows a perspective view of a further alternate embodiment of a towing device attached to a trailer according to the present subject matter.

Instead of just being placed on the towing vehicle, the towing device of the present subject matter may also be attached to an undercarriage of a towed vehicle such as a trailer. FIG. 16 shows a trailer, generally 400, which has a towing device 410 attached thereto. The towing device 410 is secured to the underside of the trailer 400. The towing device 410 includes a frame, generally 412, and a T-shaped extension bar 450 similar to the towing device 210 shown in FIG. 9. The extension bar 450 has two parallel ends 456 and 458 that have engagement devices 454 that engage slots 424 in rail supports 420. Each of the rail supports 420 have a second end 425 which is securely attached to the under side of the trailer, or to the frame 412. A first end 427 of each of the rail supports 420 engages a slit 416 formed by a slit guide 417 on a support bar 414 of a frame 412. Projections 428 extending from the first ends 427 engage slits 416. As the rail supports 420 rotate around pivot points 422, the projections 428 move freely within the slits 416. In this manner, the extension bar 450 can be rotated once it is extended outward as the engagement devices 454 are slide along the slots 424 of the rail supports 420.

The extension bar 450 has a perpendicular end 457, which extends outward from the towing device 410. The perpendicular end 457 has a coupler 455 instead of a trailer hitch attached thereto. In this manner, once the towing vehicle with a trailer hitch is backed into a perimeter of proximity of the coupler 455 on the trailer 410, the extension bar 450 may be pulled outward and rotated to obtain proper alignment of the coupler 455 with the trailer hitch in order to attach the coupler to the trailer hitch. Once the coupler is securely attached to the trailer hitch the towing vehicle may be placed in reverse to push the extension bar 450 into a towing position. As the engagement devices 454 at the first and second parallel ends 456, 458 are pushed back along the slots 424, they will soon encounter stops 426 which properly align the extension bar 450 in a towing position. At this point in time, a securing device 440 may be engaged to secure the extension bar 450 in a towing position to allow the trailer 400 to be safely towed.

The extension bar 450 may be manually extended and retracted in directions $V_3$ and $V_4$, respectively, and may also be rotated in directions $V_1$ and $V_2$ to obtain proper alignment of the coupler 455 with the trailer hitch of the towing vehicle. In this manner, the towing device may be employed on the undercarriage of the trailer for easy connection of the trailer 400 to the towing vehicle.

As with the other embodiments, the frame 412 may employ connection members 415 which may be used to attach the frame 412 to the underside of the trailer 400 although other designs may be used and still fall within the scope of the present subject matter.

It will be appreciated by those skilled in the art that various modifications and variations can be made in the present invention without departing from the scope of the invention. It is intended that the present invention include such modifications and variations as come within the scope of the appended claims and their equivalents.

What is claimed:

1. A towing device for use on a vehicle to facilitate the connection of a trailer hitch to a coupler, said towing device comprising:

a frame configured to be securably attachable to an undercarriage of the vehicle;

at least one rail support having a first end and a second end, said at least one rail support configured to movably engage said frame on said first end and rotatably securable to at least one of said frame or the undercarriage of the vehicle on said second end so that said at least one rail support is rotatable about said second end; and an extension bar having a movable engagement with said at least one rail support, said movable engagement between said at least one rail support and said extension bar permitting said extension bar to be extendable from said frame and retractable to a towing position, said extension bar being rotatable relative to said frame as said extension bar is extended; and wherein said frame includes a support bar, whereby said support bar is moveably engaged by said first end of said at least one rail support and wherein said extension bar rests on said support bar.

2. A towing device for use on a vehicle to facilitate the connection of a trailer hitch to a coupler, said towing device comprising:

a frame configured to be securably attachable to an undercarriage of the vehicle;

at least one rail support having a first end and a second end, said at least one rail support configured to movably engage said frame on said first end and rotatably securable to at least one of said frame or the undercarriage of the vehicle on said second end so that said at least one rail support is rotatable about said second end; and an extension bar having a movable engagement with said at least one rail support, said movable engagement between said at least one rail support and said extension bar permitting said extension bar to be extendable from said frame and retractable to a towing position, said extension bar being rotatable relative to said frame as said extension bar is extended;

wherein said frame includes a support bar, whereby said support bar is moveably engaged by said first end of said at lease one rail support;

wherein said extension bar includes an engagement device; and wherein said at least one rail support defines a slot therein that is engaged by said engagement device.

3. A towing device as in claim 2, wherein said engagement device comprises at least one knuckle.

4. A towing device as in claim 2, wherein said engagement device comprises at least one roller.

5. A towing device for use on a vehicle to facilitate the connection of a trailer hitch to a coupler, said towing device comprising:
   a frame configured to be securably attachable to an undercarriage of the vehicle;
   at least one rail support having a first end and a second end, said at least one rail support configured to movably engage said frame on said first end and rotatably securable to at least one of said frame or the undercarriage of the vehicle on said second end so that said at least one rail support is rotatable about said second end;
   an extension bar having a movable engagement with said at least one rail support, said movable engagement between said at least one rail support and said extension bar permitting said extension bar to be extendable from said frame and retractable to a towing position, said extension bar being rotatable relative to said frame as said extension bar is extended;
   wherein said frame includes a support bar, whereby said support bar is moveably engaged by said first end of said at least one rail support; and
   wherein said at least one rail support comprises two rail supports configured to movably engage said support bar of said frame, each of said rail supports having a first end movably engaging said support bar and a second end fixedly securable to at least one of said frame or the undercarriage of the vehicle with said rail supports spaced at a distance so that each of said rail supports is independently rotatable about said second end of that rail support.

6. A towing device as in claim 5, wherein said extension bar movably engages both of said two rail supports.

7. A towing device as in claim 6, wherein said extension bar comprises a T-shaped construction with a first parallel end, a second parallel end and a perpendicular end with said first parallel end and said second parallel end engaging said two support rails and said perpendicular end carrying at least one of a hitch or a coupler.

8. A towing device as in claim 6, wherein said extension bar comprises a horseshoe-shaped extension bar having a first arm and a second arm with each of said arms engaging one of said two rail supports whereby said horseshoe-shaped extension bar defines a crown that is extendable from and retractable to said frame.

9. A towing device as in claim 8, wherein said crown of said horseshoe-shaped extension bar has a tongue extending therefrom, said tongue carrying at least one of a hitch or a coupler.

10. A towing device for use on a vehicle to facilitate the connection of a trailer hitch to a coupler, said towing device comprising:
    a frame configured to be securably attachable to an undercarriage of the vehicle;
    at least one rail support having a first end and a second end, said at least one rail support configured to movably engage said frame on said first end and rotatably securable to at least one of said frame or the undercarriage of the vehicle on said second end so that said at least one rail support is rotatable about said second end;
    an extension bar having a movable engagement with said at least one rail support, said movable engagement between said at least one rail support and said extension bar permitting said extension bar to be extendable from said frame and retractable to a towing position, said extension bar being rotatable relative to said frame as said extension bar is extended;
    a drive unit in communication with said extension bar, said drive unit capable of moving said extension bar from an extended position to said towing position; and
    wherein at least one elastic member facilitates the moving of the extension bar from said towing position to said extended position.

11. A towing device as in claim 10, wherein said extension bar carries at least one of a hitch or a coupler.

12. A towing device as in claim 10, wherein said extension bar is configured to be securable to said frame when said extension bar is in said towing position.

13. A towing device for use on a vehicle to facilitate the connection of a trailer hitch to a coupler, said towing device comprising:
    a frame having a support bar, said frame configured to be securably attachable to an undercarriage of the vehicle;
    two rail supports operably engaging said support bar, each of said rail supports having a first end and a second end, so that said first ends of said rail supports are configured to movably engage said support bar and said second ends are rotatably securable at pivot points to at least one of said frame or the undercarriage of the vehicle allowing each of said rail supports to be movable along said support bar while being rotatable about said respective pivot points; and
    an extension bar configured to movably engage each of said rail supports, said rail supports permitting said extension bar to be extendable from said frame and retractable to a towing position while facilitating the rotatability of said extension bar.

14. A towing device as in claim 13, wherein said extension bar carries at least one of a hitch or a coupler.

15. A towing device as in claim 13, further comprising a drive unit in communication with said extension bar, said drive unit capable of moving said extension bar from an extended position to said towing position.

16. A towing device as in claim 15, wherein said drive unit comprises a winch and pulley system.

17. A towing device as in claim 15, wherein said drive unit includes a control unit for activating said drive unit.

18. A towing device as in claim 17, wherein said drive unit actuates the movement of said extension bar controlling extension, rotation, and retraction of said extension bar.

19. A towing device as in claim 18, wherein said drive unit comprises at least one of a hydraulic system or a pneumatic system.

20. A towing device as in claim 15, wherein at least one elastic member facilitates the moving of the extension bar from said towing position to said extended position.

21. A towing device as in claim 13, wherein said extension bar is configured to be securable to said frame when said extension bar is in said towing position.

22. A towing device as in claim 13, wherein said extension bar comprises a T-shaped extension bar with a first parallel end, a second parallel end and a perpendicular end with said first parallel end and said second parallel end engaging said two support rails and said perpendicular end carrying at least one of a hitch or a coupler.

23. A towing device as in claim 13, wherein said extension bar comprises a horseshoe-shaped extension bar having a first arm and a second arm with each of said arms engaging one of said two rail supports whereby said horseshoe-shaped extension bar defines a crown that is extendable from and retractable to said frame.

24. A towing device as in claim 23, wherein said crown of said horseshoe-shaped extension bar has a tongue extending therefrom, said tongue carrying at least one of a hitch or a coupler.

25. A towing device for use on a vehicle, said towing device comprising:
- a frame having a support bar, said frame configured to be securably attachable to an undercarriage of the vehicle;
- a first rail support and a second rail support operably connected to said support bar, each of said first and second rail supports having a first end and a second end, so that said first ends of said first and second rail supports are configured to movably engage said support bar and said second ends of said first and second rail supports are rotatably securable at respective pivot points to the undercarriage of the vehicle allowing each of said first and second rail supports to be movable along said support bar while being rotatable about said respective pivot points; and
- a horseshoe-shaped extension bar configured to movably engage each of said first and second rail supports, said horseshoe-shaped extension bar defining a crown and having a first arm that engages said first rail support and a second arm that engages said second rail support, said first and second rail supports permitting said crown of said horseshoe-shaped extension bar to be extendable from said frame and retractable to a towing position while facilitating the rotatability of said extension bar.

26. A towing device as in claim 25, wherein said crown of said horseshoe-shaped extension bar has a tongue extending therefrom, said tongue carrying at least one of a hitch or a coupler.

27. A towing device as in claim 25, further comprising a drive unit in communication with said extension bar, said drive unit capable of moving said extension bar from an extended position to said towing position.

28. A towing device as in claim 27, wherein said drive unit comprises a winch and pulley system.

29. A towing device as in claim 27, wherein said drive unit includes a control unit for activating said drive unit.

30. A towing device as in claim 29, wherein said drive unit actuates the movement of said extension bar controlling extension, rotation, and retraction of said extension bar.

31. A towing device for use on a vehicle to facilitate the connection of a trailer hitch to a coupler, said towing device comprising:
- a frame configured to be securely attachable to an undercarriage of the vehicle; and
- an extension bar having a movable engagement with said frame, said movable engagement between said frame and said extension bar permitting said extension bar to be extendable from said frame and retractable to towing position with said frame facilitating said extension bar to be rotatable as said extension bar is extended;
- a drive unit in communication with said extension bar, said drive unit capable of moving said extension bar from an extended position to said towing position; and
- wherein at least one elastic member facilitates the moving of the extension bar from said towing position to said extended position.

32. A towing device as in claim 31, wherein said drive unit includes a control unit for activating said drive unit.

33. A towing device as in claim 32, wherein said drive unit actuates the movement of said extension bar controlling extension, rotation, and retraction of said extension bar.

34. A towing device as in claim 31, wherein said extension bar carries at least one of a hitch or a coupler.

* * * * *